United States Patent
Yeo et al.

(10) Patent No.: US 11,057,176 B2
(45) Date of Patent: Jul. 6, 2021

(54) DM-RS TRANSMISSION METHOD AND DEVICE IN WIRELESS MOBILE COMMUNICATION SYSTEM

(71) Applicant: Samsung Electronics Co., Ltd., Suwon-si (KR)

(72) Inventors: Jeongho Yeo, Hwaseong-si (KR); Taehyoung Kim, Seoul (KR); Cheolkyu Shin, Suwon-si (KR); Younsun Kim, Seongnam-si (KR); Sungjin Park, Incheon (KR); Jinyoung Oh, Seoul (KR); Youngbum Kim, Seoul (KR); Seunghoon Choi, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 28 days.

(21) Appl. No.: 16/489,661

(22) PCT Filed: Feb. 28, 2018

(86) PCT No.: PCT/KR2018/002488
§ 371 (c)(1),
(2) Date: Aug. 28, 2019

(87) PCT Pub. No.: WO2018/160015
PCT Pub. Date: Sep. 7, 2018

(65) Prior Publication Data
US 2020/0235874 A1 Jul. 23, 2020

(30) Foreign Application Priority Data

Feb. 28, 2017 (KR) .................. 10-2017-0026570
Mar. 23, 2017 (KR) .................. 10-2017-0036945

(51) Int. Cl.
*H04L 5/00* (2006.01)
*H04W 72/04* (2009.01)

(52) U.S. Cl.
CPC ......... *H04L 5/0048* (2013.01); *H04W 72/042* (2013.01)

(58) Field of Classification Search
CPC . H04L 1/00; H04L 5/00; H04L 5/0048; H04L 5/0051; H04L 5/0053;
(Continued)

(56) References Cited

U.S. PATENT DOCUMENTS 10,171,216 B2 * 1/2019 Patel ................ H04W 72/04
10,594,456 B2 * 3/2020 Park .................. H04W 72/046
(Continued)

FOREIGN PATENT DOCUMENTS

KR  10-2015-0082339 A   7/2015
KR  10-2015-0129834 A  11/2015
(Continued)

OTHER PUBLICATIONS

ISA/KR, International Search Report and Written Opinion of the International Searching Authority, International Application No. PCT/KR2018/002488, dated Jun. 5, 2018, 14 pages.
(Continued)

*Primary Examiner* — Tri H Phan

(57) ABSTRACT

Disclosed are: a communication technique for merging, with IoT technology, a 5G communication system for supporting a data transmission rate higher than that of a 4G system; and a system therefor. The present disclosure can be applied to intelligent services (for example, smart home, smart building, smart city, smart car or connected car, health care,
(Continued)

digital education, retail, security and safety-related services, and the like) on the basis of 5G communication technology and an IoT-related technology. The present invention provides a method by which a base station transmits a DM-RS in a wireless mobile communication system supporting a first transmission time interval (TTI) and a second TTI, comprising the steps of: checking a TTI used in a downlink control channel transmission; determining, as a first pattern, a DM-RS for the downlink control channel if the TTI is the first TTI, and determining, as a second pattern, a DM-RS for the downlink control channel if the TTI is the second TTI; and transmitting, to the terminal, the downlink control channel and the DM-RS according to the determination.

14 Claims, 37 Drawing Sheets

(58) Field of Classification Search
CPC ....... H04L 5/0078; H04L 5/0082; H04L 5/02; H04L 27/2646; H04L 29/08765; H04L 43/02; H04L 45/245; H04L 47/41; H04L 47/827; H04L 67/32; H04L 67/2833; H04L 69/22; H04L 2025/03764; H04W 36/0069; H04W 72/04; H04W 72/0406; H04W 72/042; H04W 72/044; H04W 72/0446; H04W 72/0453
See application file for complete search history.

(56) References Cited

U.S. PATENT DOCUMENTS

| | | | |
|---|---|---|---|
| 10,834,718 B2 * | 11/2020 | Shin | H04L 1/18 |
| 10,856,280 B2 * | 12/2020 | Noh | H04L 1/1812 |
| 2014/0126490 A1 | 5/2014 | Chen et al. | |
| 2014/0269451 A1 | 9/2014 | Papasakellariou et al. | |
| 2016/0087709 A1 | 3/2016 | Horiuchi et al. | |
| 2016/0270059 A1 | 9/2016 | Chen et al. | |
| 2016/0360529 A1 | 12/2016 | Lee et al. | |
| 2018/0131490 A1 * | 5/2018 | Patel | H04W 72/042 |
| 2020/0127783 A1 * | 4/2020 | Kwak | H04W 72/1273 |
| 2021/0105110 A1 * | 4/2021 | Kim | H04L 5/0023 |

FOREIGN PATENT DOCUMENTS

| | | |
|---|---|---|
| KR | 10-2016-0143561 A | 12/2016 |
| KR | 10-2018-0047886 | 5/2018 |
| WO | 2016148789 A1 | 9/2016 |

OTHER PUBLICATIONS

Supplemental Partial European Search Report in connection with European Application No. 18761578.6 dated Jan. 20, 2020, 13 pages.
Ericsson, "DL DMRS design for TTI shortening," R1-1703266, 3GPP TSG-RAN WG1 Meeting #88, Athens, Greece Feb. 13-17, 2017, 12 pages.

* cited by examiner

FIG. 1N
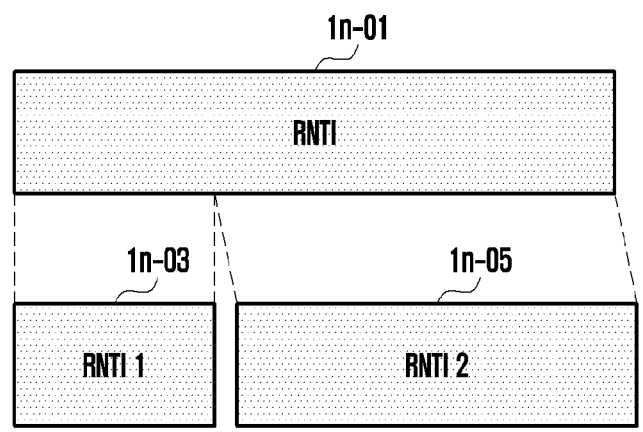
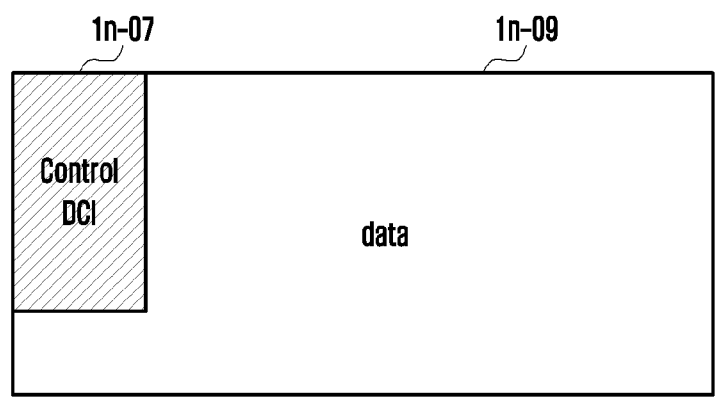

FIG. 10
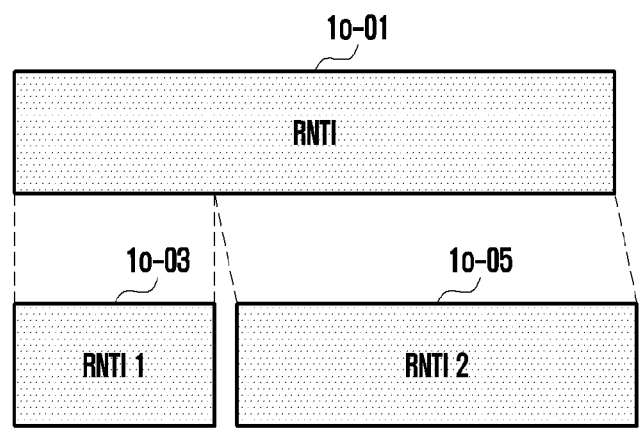
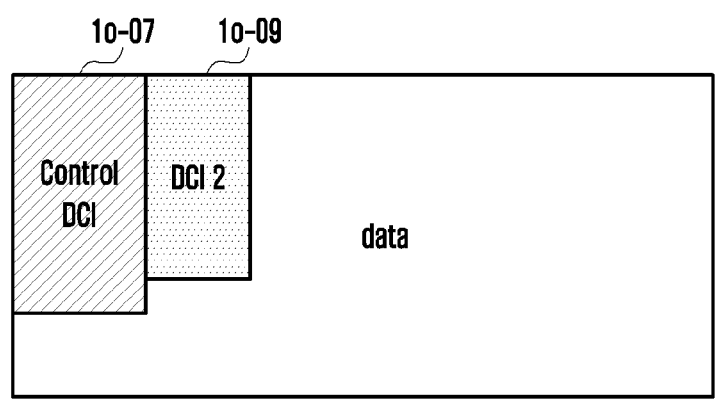

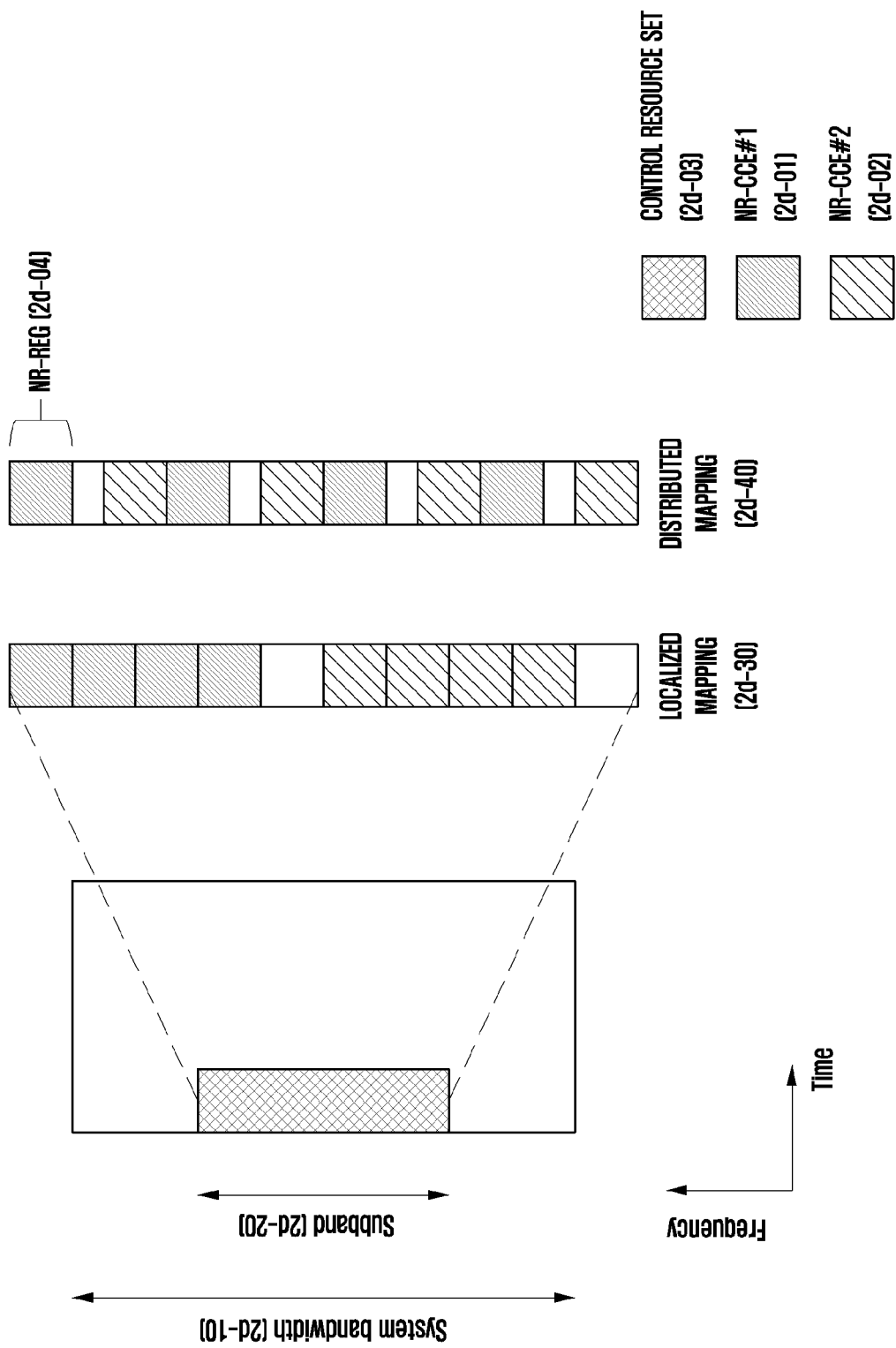

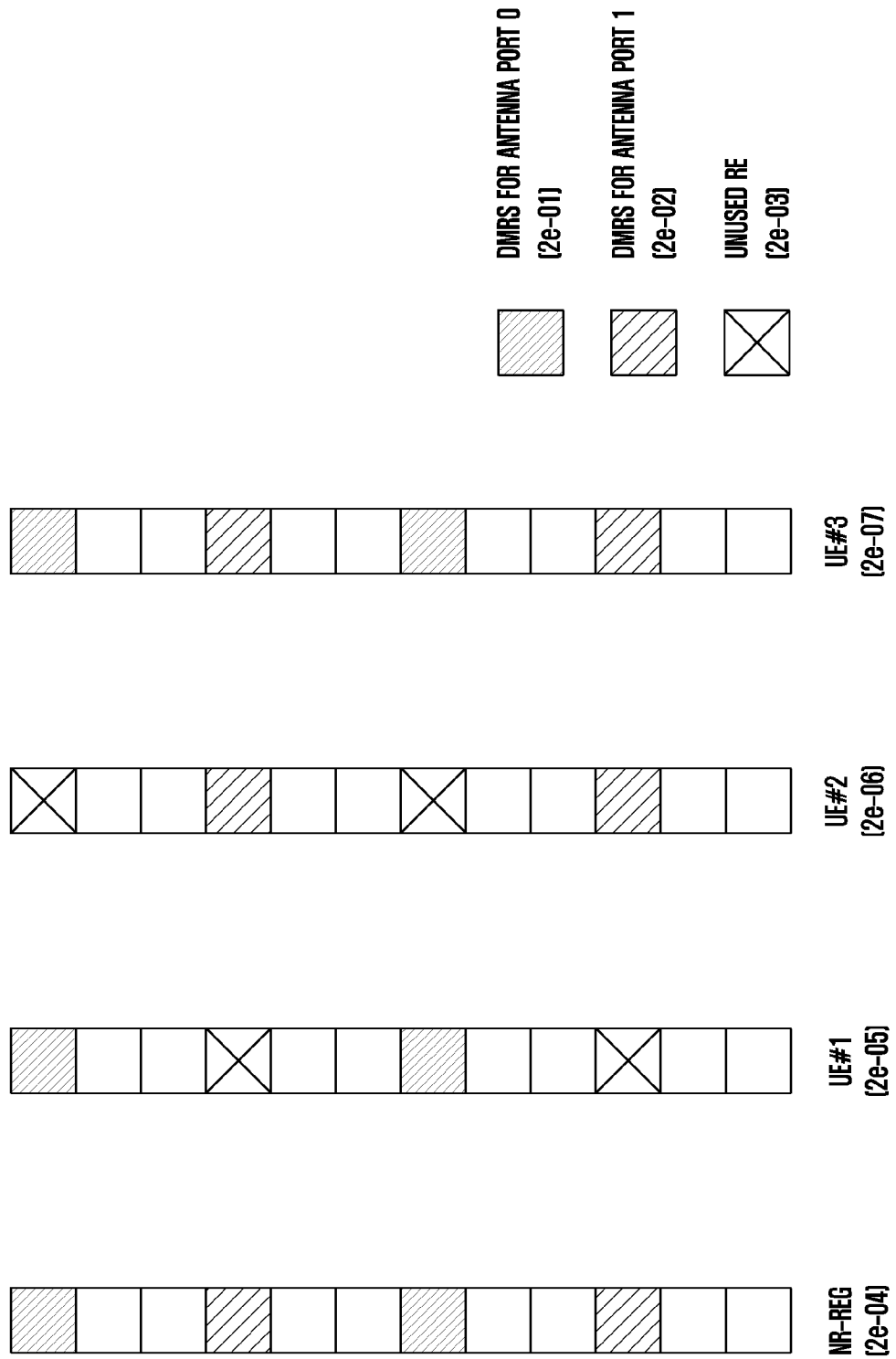

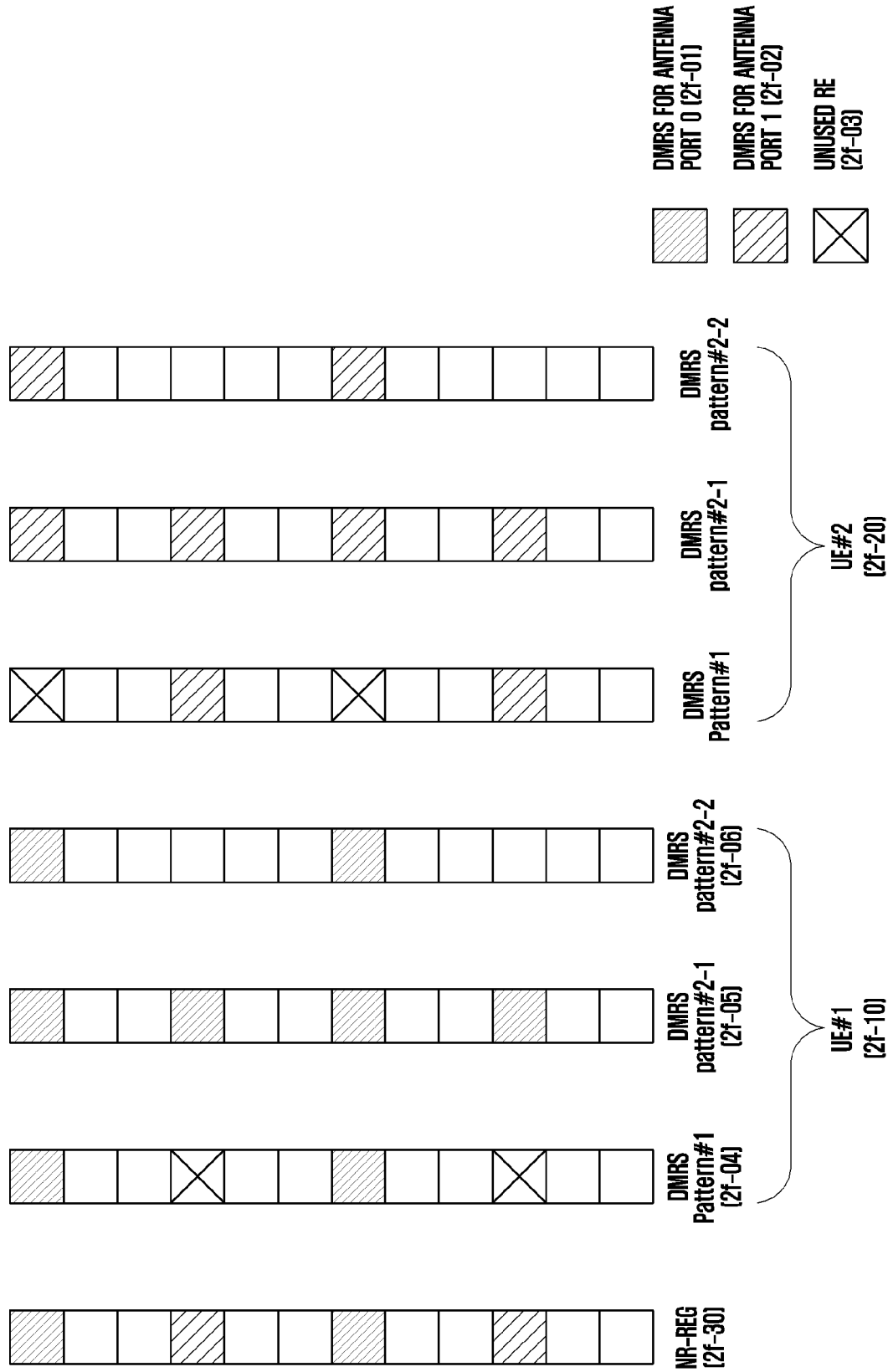

DM-RS TRANSMISSION METHOD AND DEVICE IN WIRELESS MOBILE COMMUNICATION SYSTEM

CROSS-REFERENCE TO RELATED APPLICATIONS

This application is a 371 National Stage of International Application No. PCT/KR2018/002488, filed Feb. 28, 2018, which claims priority to Korean Patent Application No. 10-2017-0026570, filed Feb. 28, 2017, and Korean Patent Application No. 10-2017-0036945, filed Mar. 23, 2017, the disclosures of which are herein incorporated by reference in their entirety.

BACKGROUND

1. Field

The disclosure relates to a wireless communication system, and a decoding method and a decoding device for a downlink control and a data signal. In more detail, the disclosure relates to a method for finding out to which user a downlink control and a data signal, which are transmitted, is delivered.

Also, the disclosure relates to a wireless communication system, and more particularly, to a method and a device for configuring a DMRS for a downlink control channel in a next-generation mobile communication system.

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance.

Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields such as those of smart homes, smart buildings, smart cities, smart cars, connected cars, smart grids, health care, smart home appliances, or high-tech medical services through the convergence of the conventional Information Technology (IT) and various industries.

Accordingly, various attempts to apply the 5G communication to the IoT network have been made. For example, technologies such as a sensor network, Machine to Machine (M2M), and Machine Type Communication (MTC) are implemented by beamforming, MIMO, and array antenna schemes. The application of a cloud RAN as the big data processing technology may be an example of convergence of the 5G technology and the IoT technology.

The 5G system considers resources for various services as compared with an existing 4G system. For example, the most representative services include an enhanced mobile broad band (eMBB), an ultra-reliable and low latency communication (URLLC), a massive machine type communication (mTBC), and an evolved multimedia broadcast/multicast Service (eMBMS). Further, the system providing the URLLC service may be referred to as a URLLC system, and the system providing the eMBB service may be referred to as an eMBB system. In addition, the terms of a service and a system may be used together.

SUMMARY

A wireless communication system, in particular, a conventional LTE system masks an RNTI value, which may mean a single ID, with a CRC included in a control signal and transmits the masked RNTI value, and a UE that succeeded in identifying a CRC by using the RNTI information determines that the corresponding control signal is a signal delivered to the UE.

Methods and devices for using a CRC of a long length to increase the number of UEs supported at once by the 5G and NR system, a method for allocating a resource mapping order, a method for dividing RNTI bits to control and data channels and masking the RNTI bits, and dividing RNTI bits to two or more kinds of DCIs and masking the masked RNTI bits.

In the 5G wireless communication system, the downlink control channel may be classified into a localized transmission scheme and a distributed transmission scheme according to a mapping scheme of a resource. Different transmission techniques may be applied to the transmission schemes, and thus, the UEs may have different pieces of DMRS configuration information.

Further, in the 5G wireless communication system, as various services having different requirements are supported, the requirements for the downlink control channel may be different. For example, in order to support a service requiring a high reliability, different pieces of DMRS configuration information or transmission techniques corresponding thereto may be applied to the UEs.

Accordingly, the disclosure provides a method for configuring a DMRS in various downlink control channel transmission environment, and operations of a base station and a UE.

In accordance with an aspect of the disclosure, a method for transmitting, by a base station, a demodulation reference signal (DM-RS) in a wireless mobile communication system supporting a first transmission time interval (TTI) and a second TTI, the method may include: identifying a TTI used in transmission of a downlink control channel; determining a DM-RS for the downlink control channel as a first pattern if the TTI is the first TTI, and determining the DM-RS for the downlink control channel as a second pattern if the TTI is the second TTI; and transmitting, to the terminal, the downlink control channel and the DM-RS according to the determination.

The number of DM-RS resources for the downlink control channel determined based on the first pattern and the number of DM-RS resources for the downlink control channel determined based on the second pattern may be different.

The length of the second TTI is shorter than the length of the first TTI, and the number of DM-RS resources for the downlink control channel determined based on the second pattern may be larger than the number of DM-RS resources for the downlink control channel determined based on the first pattern.

In accordance with another aspect of the disclosure, a method for receiving, by a terminal, a control channel in a wireless mobile communication system supporting a first transmission time interval (TTI) and a second TTI, may include: identifying a TTI used in reception of a downlink control channel; and if the TTI is the first TTI, receiving the downlink control channel by using a demodulation reference signal (DM-RS) transmitted based on a first pattern, and if the TTI is the second TTI, receiving the downlink control channel by using a DM-RS transmitted based on a second pattern.

The number of DM-RS resources transmitted based on the first pattern and the number of DM-RS resources transmitted based on the second pattern may be different.

The length of the second TTI may be shorter than the length of the first TTI, and the number of DM-RS resources transmitted based on the second pattern may be larger than the number of DM-RS resources transmitted based on the first pattern.

In accordance with another aspect of the disclosure, a base station of a wireless mobile communication system supporting a first transmission time interval (TTI) and a second TTI may include: a transceiver; and a controller configured to identify a TTI used in transmission of a downlink control channel, determine a demodulation reference signal (DM-RS) for the downlink control channel as a first pattern if the TTI is the first TTI, determine the DM-RS for the downlink control channel as a second pattern if the TTI is the second TTI, and transmit, to the terminal, the downlink control channel and the DM-RS according to the determination.

The number of DM-RS resources for the downlink control channel determined based on the first pattern and the number of DM-RS resources for the downlink control channel determined based on the second pattern may be different.

The length of the second TTI may be shorter than the length of the first TTI, and the number of DM-RS resources for the downlink control channel determined based on the second pattern may be larger than the number of DM-RS resources for the downlink control channel determined based on the first pattern.

In accordance with another aspect of the disclosure, a terminal of a wireless mobile communication system supporting a first transmission time interval (TTI) and a second TTI may include: a transceiver; and a controller configured to identify a TTI used in reception of a downlink control channel, if the TTI is the first TTI, receive the downlink control channel by using a demodulation reference signal (DM-RS) transmitted based on a first pattern, and if the TTI is the second TTI, and receive the downlink control channel by using a DM-RS transmitted based on a second pattern.

The number of DM-RS resources transmitted based on the first pattern and the number of DM-RS resources transmitted based on the second pattern may be different.

The length of the second TTI may be shorter than the length of the first TTI, and the number of DM-RS resources transmitted based on the second pattern may be larger than the number of DM-RS resources transmitted based on the first pattern.

In accordance with another aspect of the disclosure, a base station of a wireless mobile communication system may include: a transceiver; and a controller configured to identify an aggregation level of a downlink control channel, determine a demodulation reference signal (DM-RS) for the downlink control channel as a first pattern if the identified aggregation level of the downlink control channel is less than a preset threshold value, determine the DM-RS for the downlink control channel as a second pattern if the identified aggregation level of the downlink control channel is the preset threshold value or more, and transmit, to a terminal, the downlink control channel and the DM-RS according to the determination.

The number of DM-RS resources for the downlink control channel determined based on the first pattern and the number of DM-RS resources for the downlink control channel determined based on the second pattern may be different.

The number of the DM-RS resources for the downlink control channel determined based on the second pattern may be larger than the number of the DM-RS resources for the downlink control channel determined based on the first pattern.

As described above, the disclosure provides an operation method for determining to which user a control signal is delivered when a large number of users are present to allow a base station to support a number of UEs at the same time.

In addition, the disclosure provides a DMRS signal transmission scheme for a downlink control signal in the 5G communication system to support various services having different requirements and efficiently operate the 5G wireless communication system as well.

BRIEF DESCRIPTION OF THE DRAWINGS

FIG. 1LA is a method which is used for the purpose of using a mapping order for defining groups of sub-carriers and indicating the order of the groups;

FIG. 1MA is a view illustrating a procedure which is used for the purpose of allocating an RNTI to a terminal and indicating REG mapping order information;

FIG. 1N is a view illustrating an example of a terminal classifying method according to a third embodiment;

FIG. 1O is a view illustrating an example of a terminal classifying method according to a fourth embodiment;

FIG. 2D is a view illustrating allocation of resources of a 5G downlink control channel;

FIG. 2E is a view illustrating an example of configuring a terminal-specific DMRS port;

FIG. 2F is a view illustrating a DMRS pattern according to an embodiment of the disclosure;

DETAILED DESCRIPTION

Embodiment A

Figure 1A:
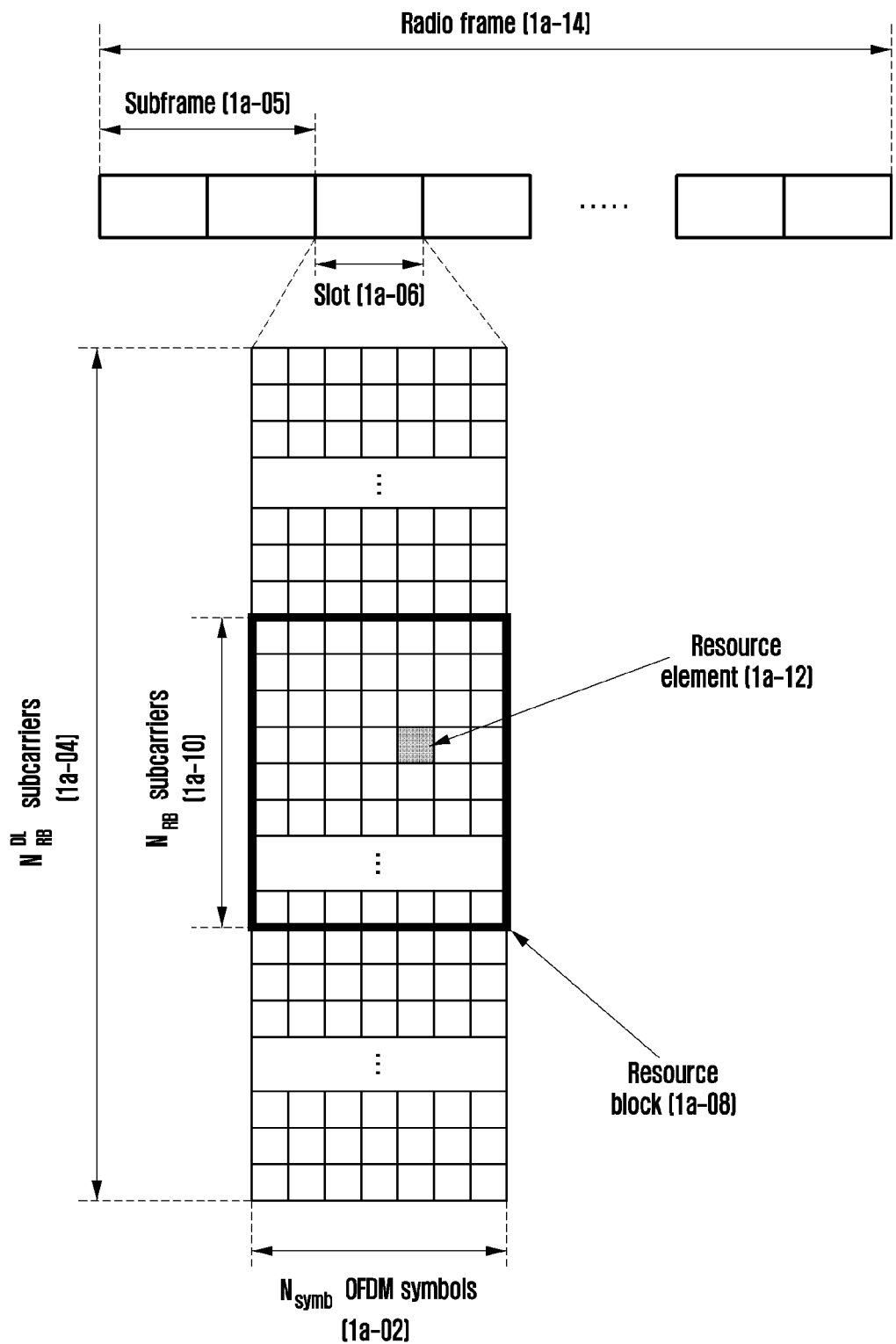
FIG. 1A is a view illustrating a downlink time-frequency area transmission structure of an LTE or LTE-A system.

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system. In order to achieve a high data transmission rate, implementation of 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance. Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has been evolved to an Internet of Things (IoT) network in which distributed components such as objects exchange and process information from a human-oriented connection network in which humans generate and consume information. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields such as those of smart homes, smart buildings, smart cities, smart cars, connected cars, smart grids, health care, smart home appliances, or high-tech medical services through the convergence of the conventional Information Technology (IT) and various industries.

Accordingly, various attempts to apply the 5G communication to the IoT network have been made. For example, technologies such as a sensor network, Machine to Machine (M2M), and Machine Type Communication (MTC) are implemented by beamforming, MIMO, and array antenna schemes. The application of a cloud RAN as the big data processing technology may be an example of convergence of the 5G technology and the IoT technology.

Meanwhile, the New Radio access technology that is a new 5G communication is designed such that various services may be freely multiplexed in a time and frequency resource, and thus, a reference signal, such as a waveform/ numerology, may be dynamically or freely allocated according to the necessity of the corresponding service. In order to provide an optimum service to a UE in a wireless communication, it is important to transmit optimized data through measurement of the quality of channels and the amount of interferences, and thus it is essential to precisely measure a channel state. However, unlike 4G communication in which the channel and interference characteristics are not significantly changed according to the frequency resources, the channel and interference characteristics of the 5G channel are significantly changed according the services, and thus it is necessary to support a subset in consideration of a Frequency Resource Group (FRG) that allows division and measurement of the channel and interference characteristics. Meanwhile, in the NR system, the kinds of the supported services may be divided into categories, such as an Enhanced mobile broadband (eMBB), a massive Machine Type Communications (mMTC), and an Ultra-Reliable and low-latency Communications (URLLC). The eMBB is a service for high-rate transmission of high-capacity data, and the mMTC is a service for minimization of UE power and connection of a plurality of UEs, and URLLC is a service for a high reliability and a low latency. Different requirements may be applied according to the kinds of the services applied to the UE.

In this way, a plurality of services may be provided to the users in the communication systems, and a method for providing various services in the same time interval according to the features of the services to provide the services to the users, and a device using the method are required.

Hereinafter, embodiments of the disclosure will be described in detail with reference to the accompanying drawings.

In describing the exemplary embodiments of the disclosure, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not entirely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Here, it will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

And each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, "unit" or divided into a larger number of elements, "unit". Moreover, the elements and "units" may be implemented to reproduce one or more CPUs within a device or a security multimedia card. Also, in an embodiment, "unit" may include one or more processors.

A wireless communication system has developed to be a broadband wireless communication system that provides a high speed and high quality packet data service, like the communication standards, for example, High Speed Packet Access (HSPA) of 3GPP, Long Term Evolution (LTE) or evolved universal terrestrial radio access (E-UTRA), LTE-advanced (LTE-A), High Rate Packet Data (HRPD) of 3GPP2, Ultra Mobile Broadband (UMB), and 802.16e of IEEE, or the like, beyond the voice-based service provided at the initial stage. Also, a communication standard of 5G or new radio (NR) is being developed as a 5G wireless communication system.

An LTE system, which is a representative example of the broadband wireless communication system, employs an Orthogonal Frequency Division Multiplexing (OFDM) scheme for a downlink (DL), and employs a Single Carrier Frequency Division Multiple Access (SC-FDMA) scheme for an uplink (UL). An uplink means a wireless link, through which a User Equipment (UE) or a Mobile Station (MS) transmits a data or control signal to a base station (an eNode B or a base station (BS)), and a downlink is a wireless link, through which a base station transmits a data or control signal to a UE. In the multiple access schemes as described above, time-frequency resources for carrying data or control information are allocated and operated in a manner to prevent overlapping of the resources, i.e., to establish the orthogonality, between users, so as to identify data or control information of each user.

When decoding fails at the initial transmission, the LTE system employs Hybrid Automatic Repeat reQuest (HARQ) that retransmits the corresponding data in a physical layer. A HARQ scheme may allow a receiver to transmit information (Negative Acknowledgement (NACK)) informing a failure of decoding to a transmitter and allow the transmitter to retransmit the corresponding data in the physical layer when a receiver fails to precisely decode the data. The receiver may combine data retransmitted from the transmitter and previous data, decoding of which fails, whereby data reception performance may increase. Also, when the receiver accurately decodes data, the receiver transmits information (ACK) reporting that decoding is successfully executed, so that the transmitter transmits new data.

FIG. 1 is a view illustrating the basic structure of the time-frequency domain, which is a radio resource region where data or a control channel is transmitted in a downlink of an LTE system.

Referring to FIG. 1, the horizontal axis indicates the time domain, and the vertical axis indicates the frequency domain. The minimum transmission unit in the time area is an OFDM symbol, and $N_{symb}$ 1a-02 OFDM symbols constitute one slot 1a-06 and two slots constitute one subframe 1a-05. The length of one slot is 0.5 ms, and the length of one subframe is 1.0 ms. Further, the radio frame 1a-14 is a time area unit including ten subframes. The minimum transmission unit in the frequency area is a subcarrier, and the entire system transmission bandwidth includes a total of $N_{BW}$ (1a-04) subcarriers.

In the time-frequency domain, the basic resource unit is a resource element (RE)-12, and an RE is expressed by an OFDM symbol index and a subcarrier index. The resource block (RB or Physical Resource Block: PRB) 1a-08 is defined by $N_{symb}$(1a-02) continuos OFDM symbols in a time area and $N_{RB}$(1a-10) subcarriers in a frequency area. Accordingly, one RB 1a-08 includes $N_{symb} \times N_{RB}$ REs 1a-12. Generally, the minimum transmission unit of data is an RB. Although generally $N_{symb}$=7, $N_{RB}$=12 and $N_{BW}$ and $N_{RB}$ is proportional to the bandwidth of the system transmission band in the LTE system, another value may be used in another system other than the LTE system. Data rate increases in proportion to the number of RBs scheduled to the UE. The LTE system is operated after six transmission bandwidths are defined. In the FDD system in which a downlink and an uplink are classified by a frequency and is operated, the downlink transmission bandwidth and the uplink transmission bandwidth may be different. A channel bandwidth may indicate an RF bandwidth corresponding to a system transmission bandwidth. Table 1 provided below indicates a relationship between a system transmission bandwidth and a channel bandwidth defined in the LTE system. For example, when LTE system has a channel bandwidth of 10 MHz, the transmission bandwidth may include 50 RBs.

TABLE 1

| | Channel bandwidth $BW_{Channel}$ [MHz] | | | | | |
|---|---|---|---|---|---|---|
| | 1.4 | 3 | 5 | 10 | 15 | 20 |
| Transmission bandwidth configuration $N_{RB}$ | 6 | 15 | 25 | 50 | 75 | 100 |

The downlink control information may be transmitted within the initial N OFDM symbols in the subframe. In the embodiment, generally N={1, 2, 3}. Accordingly, according to the amount of control information that is to be transmitted to the current subframe, the N value may be variably applied for each subframe. The transmitted control information may include information on a control channel transmission interval indicator that represents over which number of OFDM symbols the control information is transmitted, scheduling information on the downlink data or the uplink data, and HARQ ACK/NACK.

In the LTE system, scheduling information associated with downlink data or uplink data may be transmitted from a base station to a terminal via downlink control information (DCI). The DCI is defined according to various formats, and according to the formats, may represent whether the information is scheduling information (UL grant) for the uplink data or scheduling information (DL grant) for the downlink data, whether the information is a compact DCI having a small size of control information, whether spatial multiplexing using a multiple antenna is applied, and whether the information is DCI for power control. For example, DCI format 1 that is scheduling control information (DL grant) for the downlink data may include one of the following pieces of control information.

Resource allocation type 0/1 flag: it is indicated whether the resource allocation scheme is type 0 or type 1. Type 0 applies a bitmap scheme and allocates resources in units of resource block groups (RBGs). In the LTE system, a basic scheduling unit is a resource block (RB) expressed by time and frequency domain resources, and an RBG includes a plurality of RBs and is used as a basic scheduling unit in the type 0 scheme. Type 1 allows allocation of a predetermined RB in an RBG.

Resource block assignment: An RB allocated to data transmission is indicated. An expressed resource is determined according to the system bandwidth and resource allocation scheme.

Modulation and coding scheme (MCS): a modulation scheme used in data transmission and the size of a transport block that is data to be transmitted are indicated.

HARQ process number: the process number of HARQ is indicated.

New data indicator: it is indicated whether it is a HARQ initial transmission or a retransmission.

Redundancy version: a redundancy version of HARQ is indicated.

Transmit Power Control (TPC) command for PUCCH (Physical Uplink Control CHannel: a transmission power control command for a PUCCH that is an uplink control channel is indicated.

The DCI may be transmitted on a PDCCH (Physical downlink control channel) (or control information, hereinafter used together) that is a downlink physical control channel or an EPDCCH (Enhanced PDCCH) (or improved control information, hereinafter used together).

Generally, the DCI is scrambled with a predetermined radio network temporary identifier (RNTI) (or a terminal identifier), independently for each terminal, a cyclic redundancy check (CRC) is added, and channel coding is performed, whereby each independent PDCCH is configured and transmitted. In the time domain, a PDCCH is mapped and transmitted during the control channel transmission interval. The frequency area mapping location of the PDCHH may be determined by an identifier (ID) of each UE, and may be transmitted over the entire system transmission band.

The downlink data may be transmitted on a PDSCH (Physical Downlink Shared Channel) that is a physical channel for downlink data transmission. The PDSCH may be transmitted from the control channel transmission interval, and the scheduling information such as a detailed mapping location in a frequency area and a modulation scheme may be determined on the basis of a DCI transmitted through the PDCCH.

Via an MCS formed of 5 bits in the control information included in the DCI, a base station may report the modulation scheme applied to a PDSCH to be transmitted to a terminal, and the size (transport block size (TBS)) of data to be transmitted. In the embodiment, the MCS may include five bits or more than or less than five bits. The TBS corresponding top the size before channel coding for error correction is applied to data (transport block, TB) to be transported by the base station.

The modulation scheme supported by the LTE system includes Quadrature Phase Shift Keying (QPSK), 16 Quadrature Amplitude Modulation (16QAM), and 64QAM. Modulation orders (Qm) correspond to 2, 4, and 6 respectively. That is, in the case of the QPSK modulation, 2 bits are transmitted per symbol. In the case of the 16QAM modulation, 4 bits are transmitted per symbol. In the case of 64QAM modulation, 6 bits are transmitted per symbol. Further, a modulation scheme of 256 QAM or more also may be used according to a modification of the system.

Figure 1B:
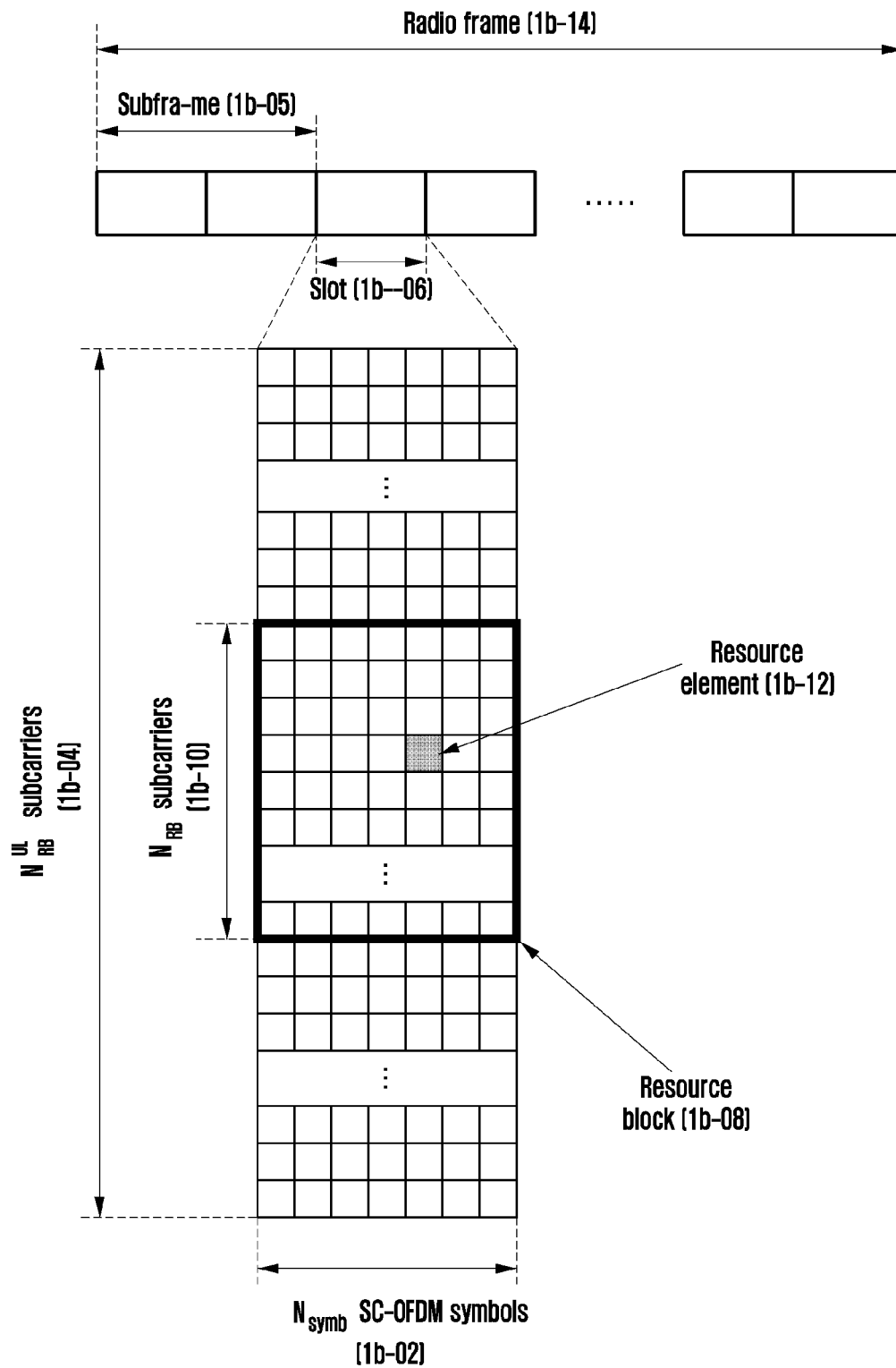
FIG. 1B is a view illustrating an uplink time-frequency area transmission structure of an LTE or LTE-A system.

FIG. 1B is a view illustrating the basic structure of the time-frequency domain, which is a radio resource region where data or a control channel is transmitted in an uplink of an LTE-A system.

Referring to FIG. 1, the horizontal axis indicates the time domain, and the vertical axis indicates the frequency domain. The minimum transmission unit in the time area is a SC-FDMA symbol 1b-02, and NsymbUL SC-FDMA symbols may constitute one slot 1b-06. Further, two slots constitutes one subframe 1b-05. The minimum transmission unit in the frequency area is a subcarrier, and the entire system transmission bandwidth 1b-04 includes a total of $N_{BW}$ subcarriers. The $N_{BW}$ may have a value that is proportional to the system transmission band.

In the time-frequency domain, the basic resource unit is a resource element (RE) 1, and an RE is defined by an SC-FDMA symbol index and a subcarrier index. The Resource Block pair (RB pair) 1b-08 may be defined as NsymbUL continuous SC-FDMA symbols in the time area and NscRB continuous subcarriers in the frequency area. Accordingly, a single RB is formed of $N_{symb}^{DL} \times N_{sc}^{RB}$ REs. In general, the minimum transmission unit of data or control information is an RB unit. A PUCCH is mapped to a frequency domain corresponding to 1 RB, and may be transmitted during one subframe.

In the LTE system, a timing relationship of a PUCCH or PUSCH that is an uplink physical channel to which HARQ ACK/NACK including a PDSCH that is a physical channel for downlink data transmission and a PDCCH/EPDDCH including semi-persistent scheduling release (SPS release) is transmitted is defined. For example, in the LTE system operating according to frequency division duplex (FDD), a HARQ ACK/NACK corresponding to a PDCCH or EPDDCH including SPS release or a PDSCH transmitted in subframe (n−4) is transmitted via a PUCCH or a PUSCH in subframe n.

In an LTE system, a downlink HARQ employs an asynchronous HARQ scheme in which a data retransmission time point is not fixed. That is, when the base station receives the feedback of HARQ NACK from the UE for the initial transmission data transmitted by the base station, the base station freely determines a transmission time point of the retransmission data by a scheduling operation. For the HARQ operation, the terminal buffers data which is determined to be an error as a result of decoding received data, and combines the data and a subsequently retransmitted data.

When the terminal receives a PDSCH including downlink data transmitted from the base station in subframe n, the terminal transmits uplink control information including a HARQ ACK or NACK with respect to the downlink data via a PUCCH or a PUSCH in subframe (n+k). In this instance, k is defined differently according to FDD or time division duplex (TDD) of the LTE system, and a configuration thereof. For example, in the case of the FDD LTE system, k is fixed to 4. In the case of the TDD LTE system, k may be changed according to a subframe configuration and a subframe number.

In an LTE system, the uplink HARQ employs a synchronous HARQ scheme in which a data retransmission time point is fixed, differently from the downlink HARQ. In other words, the uplink/downlink timing relation of a Physical Uplink Shared CHannel (PUSCH), which is a physical channel for uplink data transmission, a PDCCH, which is a downlink control channel preceding the PUSCH, and a Physical Hybrid Indicator CHannel (PHICH), which is a physical channel for transmission of a downlink HARQ ACK/NACK corresponding to the PUSCH, is fixed by the rule as follows.

When receiving a PHICH for transmission of a downlink HARQ ACK/NACK or a PDCCH including uplink scheduling control information transmitted from an eNB in subframe n, a UE transmits uplink data corresponding to the control information in sub-frame (n+k) through a PUSCH. In this instance, k is defined differently according to FDD or time division duplex (TDD), and a subframe configuration thereof. For example, in the case of the FDD LTE system, k is fixed to 4. In the case of the TDD LTE system, k may be changed according to a subframe configuration and a subframe number. In the FDD LTE system, if the base station transmits approval of uplink scheduling or a downlink control signal and data to the UE in subframe n, the UE receives the approval of uplink scheduling or the downlink control signal and the data in subframe n. First, when receiving the approval of uplink scheduling in subframe n, the UE transmits uplink data in subframe n+4. If receiving the downlink control signal and the data in subframe, the UE transmits HARQ ACK or NACK for the downlink data in subframe n+4. Accordingly, the UE receives the approval of the uplink scheduling and transmits the uplink data or receives the downlink data, and a period of time for preparation for delivery of HARQ ACK or NACk is 3 ms corresponding to three subframes. Further, when the UE receives a PHICH carrying a downlink HARQ ACK/NACK from the eNB in sub-frame i, the PHICH corresponds to a PUSCH transmitted in sub-frame (i-k) by the UE. Then, the k is differently defined according to the FDD or TDD of the system of the LTE and the configurations thereof. For example, in the case of the FDD LTE system, k is fixed to 4. In the case of the TDD LTE system, k may be changed according to a subframe configuration and a subframe number.

Figure 1C:
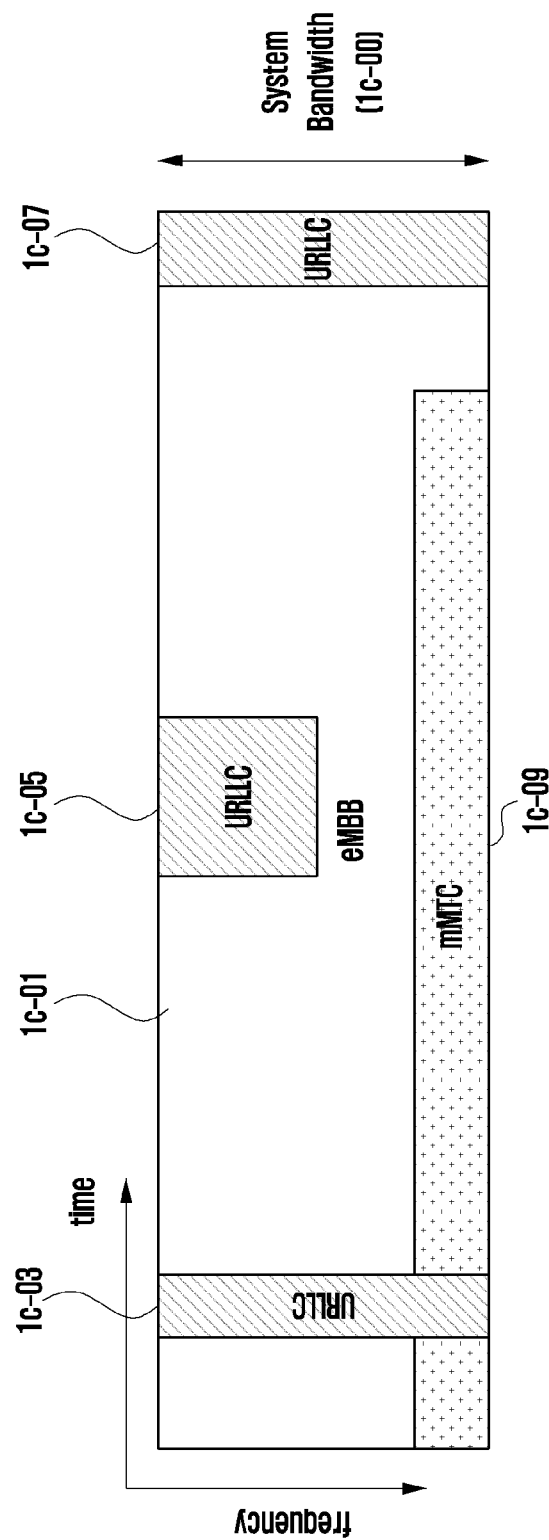
FIG. 1C is a view illustrating that data for eMBB, URLLC, and mMTC are allocated in a frequency-time resource in a communication system.
Figure 1D:
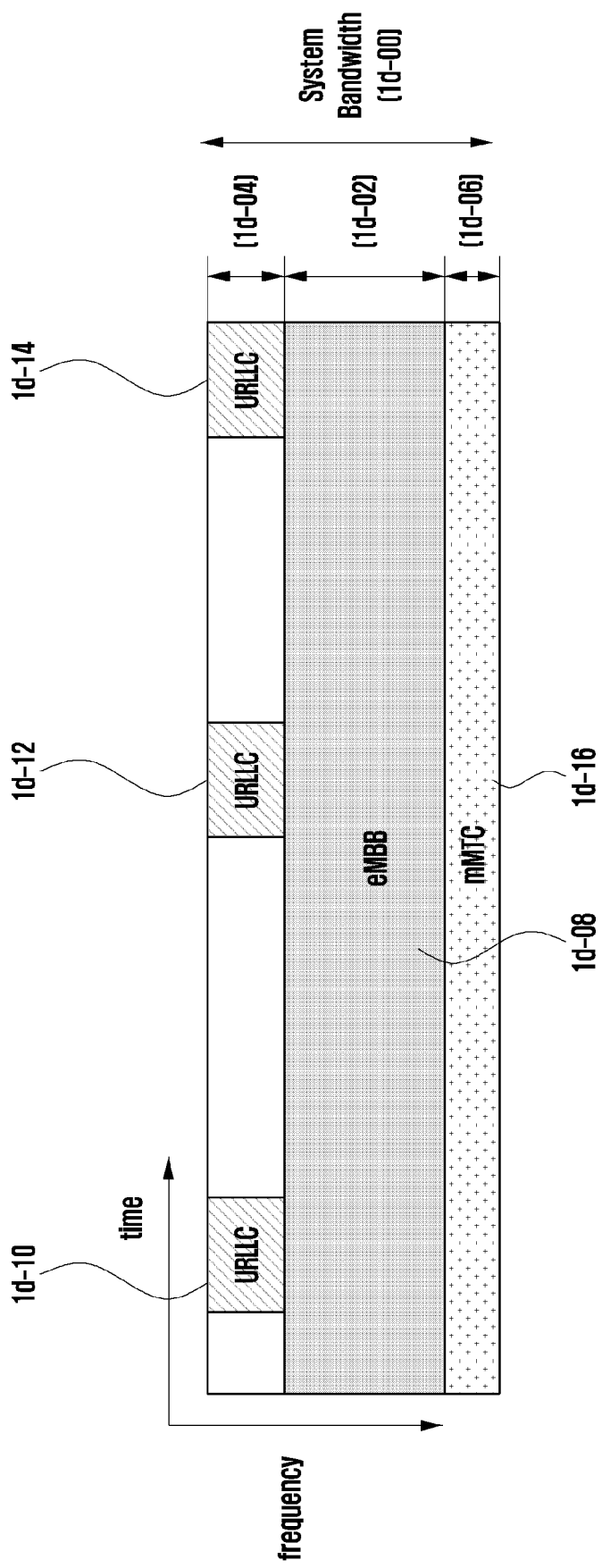
FIG. 1D is a view illustrating that data for an eMBB, a URLLC, and an mMTC are allocated in a frequency-time resource in a communication system.

FIGS. 1C and 1D illustrate that data for an eMBB, a URLLC, and an mMTC that are services considered in a 5G or NR system are allocated in a frequency-time resource.

Referring to FIGS. 1C and 1D, a scheme of allocating a frequency and time resource for transmission of information in each system.

First, FIG. 1C illustrates that data for an eMBB, a URLLC, and an mMTC are allocated in an entire system frequency band 1c-00. When URLLC data 1c-03, 1c-05, and 1c-07 are generated and needs to be transmitted while an eMBB 1c-01 and an mMTC 1c-09 are allocated in a specific frequency band and is transmitted, the URLLC data 1c-03, 1c-05, and 1c-07 may be transmitted while portions, to which the eMBB 1c-01 and the mMTC 1c-09 are already allocated, are made empty or are not transmitted. Because among the services, the URLLC needs to reduce latency, the URLLC data 1c-03, 1c-05, and 1c-07 may be allocated to portions of the resource 1c-01, to which the eMBB is allocated, and be transmitted. Of course, when the URLLC is additionally allocated and transmitted in the resource, to which the eMBB is allocated, the eMBB data may not be transmitted in the repeated frequency-time resource, and thus the transmission performance of the eMBB data may be lowered. That is, in the above case, transmission of the eMBB data may fail due to the allocation of the URLLC.

In FIG. 1D, the entire system frequency band 1d-00 is divided into sub-bands 1d-02, 1d-04, and 1d-06, which may be used for transmitting services and data. The information related to the configuration of the sub-bands may be determined in advance, and the information may be transmitted to a UE through higher signaling. Further, the information related to the sub-bands may be arbitrarily divided by a base station or a network node and services may be provided to a UE without transmission of separate sub-band configuration information. FIG. 1D illustrates that the sub-band 1d-02 is used for transmission of the eMBB data, the sub-band 404 is used for transmission of the URLLC data, and the sub-band 1d-06 is used for transmission of the mMTC data.

In the overall embodiment, the length of a transmission time interval TTI used for transmission of the URLLC may be shorter than the length of a TTI used for transmission of the eMBB or mMTC. Further, a response to the information related to the URLLC may be transmitted earlier than the eMBB or the mMTC, and thus information can be transmitted and received at a low latency.

Figure 1E:
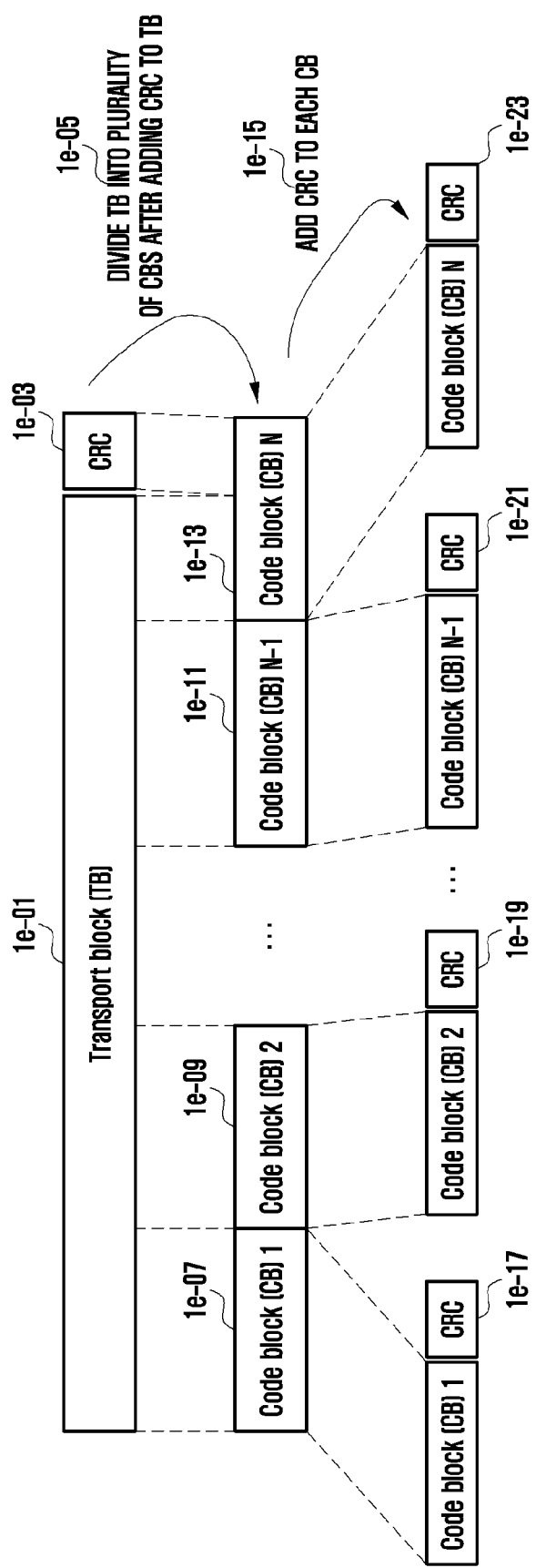
FIG. 1E is a view illustrating a structure in which one transport block is divided into several code blocks and a CRC is added according to an embodiment.

FIG. 1E is a view illustrating a process of dividing one transport block into several code blocks and adding a CRC.

Referring to FIG. 1E, a CRC 1e-03 may be added to a final part or a foremost part of one transport block (TB) 1e-01 that is to be transmitted in an uplink or a downlink. The CRC may have 16 bits, 24 bits, or bits fixed in advance, or may have variable bits according to a channel situation or the like, and may be used to determine whether channel coding is successful. The blocks 1e-01 and 1e-03, to which the TB and the CRC are added, may be divided into several code blocks (CB) 1e-07, 1e-09, 1e-11, and 1e-13 (1e-05). The code blocks may be divided after the maximum sizes thereof are determined in advance, and in this case, the final code block 1e-13 may be adjusted such that the size thereof may be smaller than the sizes of the other code blocks or may be made to be the same as the other code blocks by inserting 0, a random value, or 1. CRCs 1e-17, 1e-19, 1e-21, 1e-23 may be added to the divided code blocks, respectively (1e-15). The CRCs may have 16 bits, 24 bits, or bits fixed in advance, and may be used to determine whether channel coding is successful. However, the CRC 1e-03 added to the TB and the CRCs 1e-17, 1e-19, 1e-21, 1e-23 added to the code blocks may be omitted according to the kind of the channel code that is to be applied to the code blocks. For example, when not a turbo code but an LDPC code is applied to the code blocks, the CRCs 1e-17, 1e-19, 1e-21, 1e-23, which are to be inserted into the code blocks, respectively, may be omitted. However, even when the LDPC is applied, the CRCs 1e-17, 1e-19, 1e-21, 1e-23 may be added to the code blocks as they are. Further, when a polar code is used, the CRCs may be added or omitted.

Figure 1F:
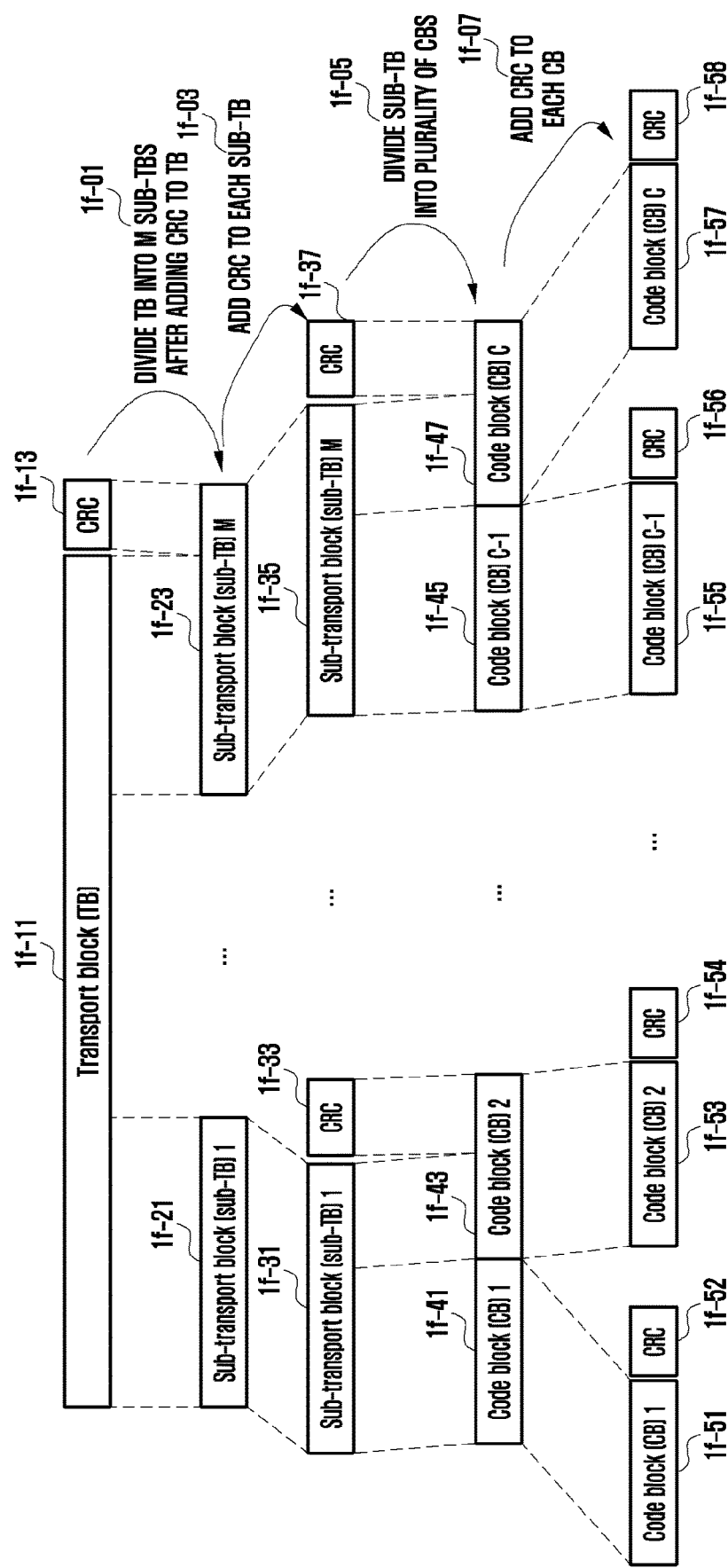
FIG. 1F is a view illustrating an example of a structure for a method for constituting a sub-TB and a CB and adding a CRS of the disclosure.

FIG. 1F is a view illustrating a method for dividing one TB into M sub-TBs 1f-01 and dividing each of the sub-TBs into one or more CBs 1f-05. The reference numeral 1f-11 denotes one TB that is delivered from a higher layer to a physical layer. In the physical layer, the TB 1f-11 is regarded as data. Further, the CRC 1f-13 is added to the TB. To generate the CRC 1f-13, the TB 1f-11 and a cyclic generator polynomial may be used, and the cyclic generator polynomial may be defined in various methods. For example, it is assumed that cyclic generator polynomial gCRC24A(D) for a 24 bit CRC is $D24+D23+D18+D17+D14+D11+D10+D7+D6+D5+D4+D3+D+1$ and L is 24, values, the remainders of which are 0 after, for TB data a0, a1, a2, a3, . . . , and aA−1, CRC p0, p1, p2, p3, . . . , pL−1, a0DA+23+a1DA+22+ . . . * +aA−1D24+p0D23+p1D22+ . . . * +p22D1+p23 is divided by gCRC24A(D) may be determined as p0, p1, p2, p3, . . . , and pL−1. Although it has been described above as an example that the length L of the CRC is 24, the length of the CRC may be determined to be various lengths, such as 12, 16, 24, 32, 40, 48, and 64. Through the process, after the CRC is added to the TB, M sub-TBs are divided (1f-01). The one obtained by adding the CRC to the TB is divided into M sub-TBs 1f-21 and 1f-23. CRCs 1f-33 and 1f-37 are added to the divided sub-TBs 1f-31 and 1f-35 (1f-03). As compared with when a CRC added to the TB is generated, a CRC having a different length or a different cyclic generator polynomial may be used as the CRC added to the sub-TB. The divided sub-TBs and the added CRC are divided into several CBs 1f-41, 1f-42, 1f-45, and 1f-47 (1f-05). CRCs 1f-52, 1f-54, 1f-56, and 1f-58 are added to divided CBs 1f-51, 1f-53, 1f-55, and 1f-57, respectively (1f-07).

Figure 1G:
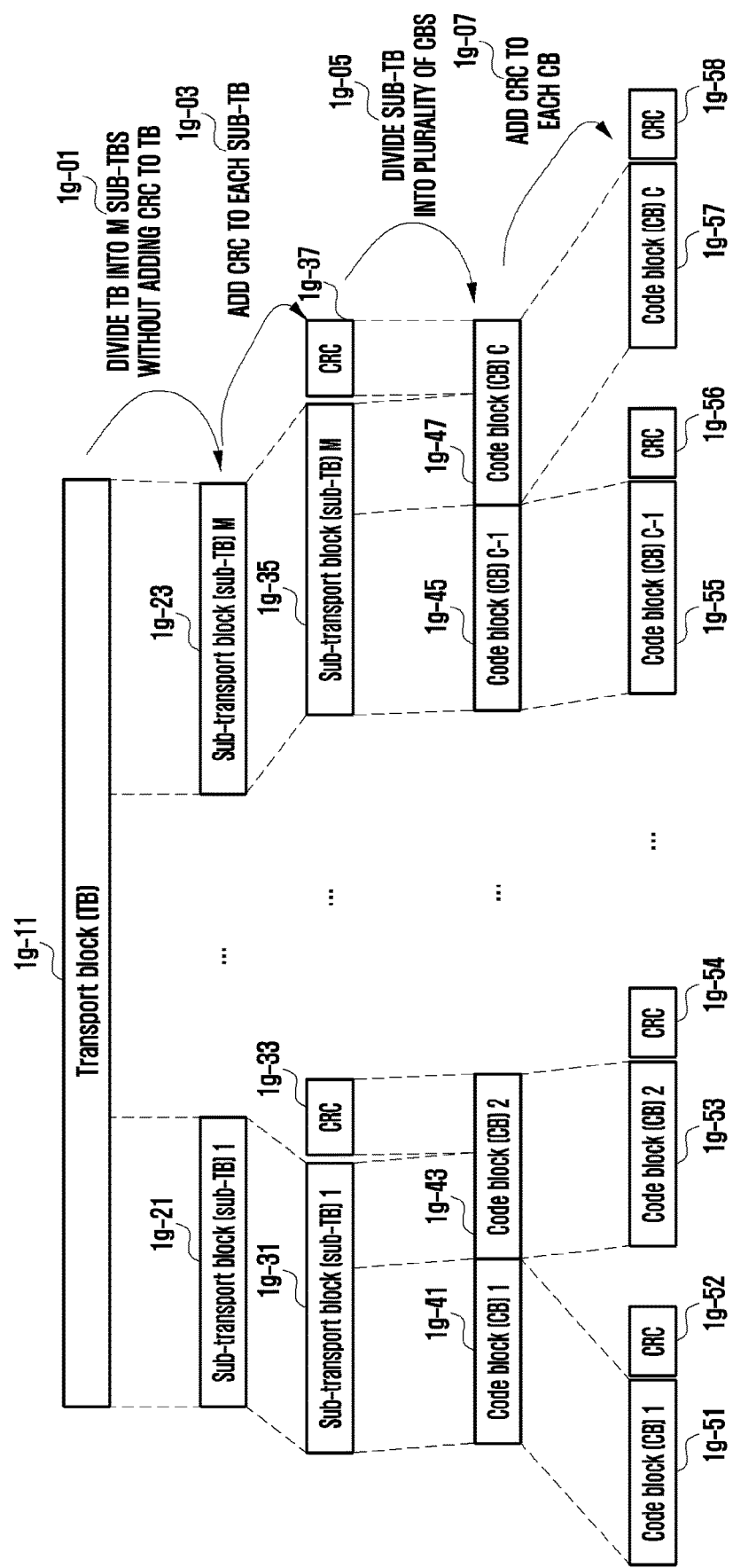
FIG. 1G is a view illustrating an example of a structure for a method for constituting a sub-TB and a CB and adding a CRS of the disclosure.
Figure 1H:
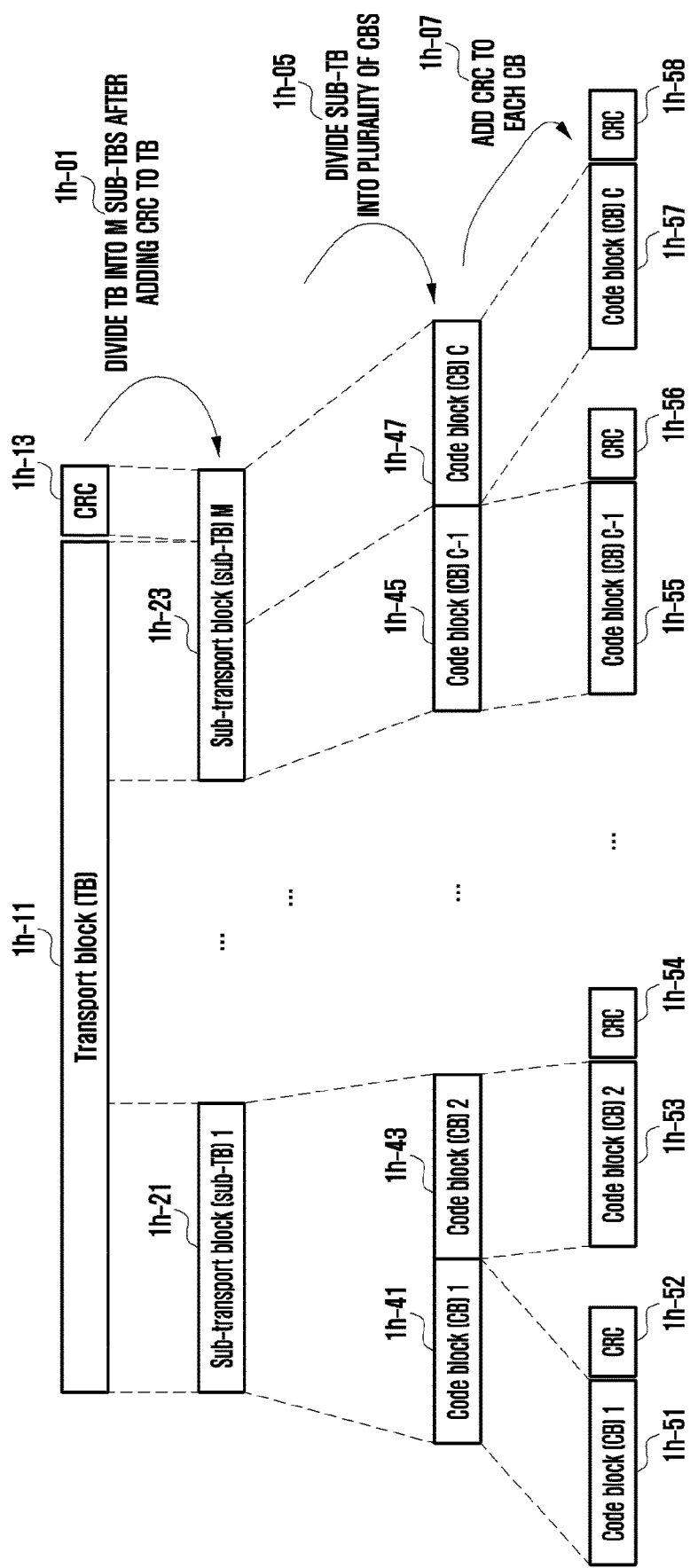
FIG. 1H is a view illustrating an example of a structure for a method for constituting a sub-TB and a CB and adding a CRS of the disclosure.
Figure 1I:
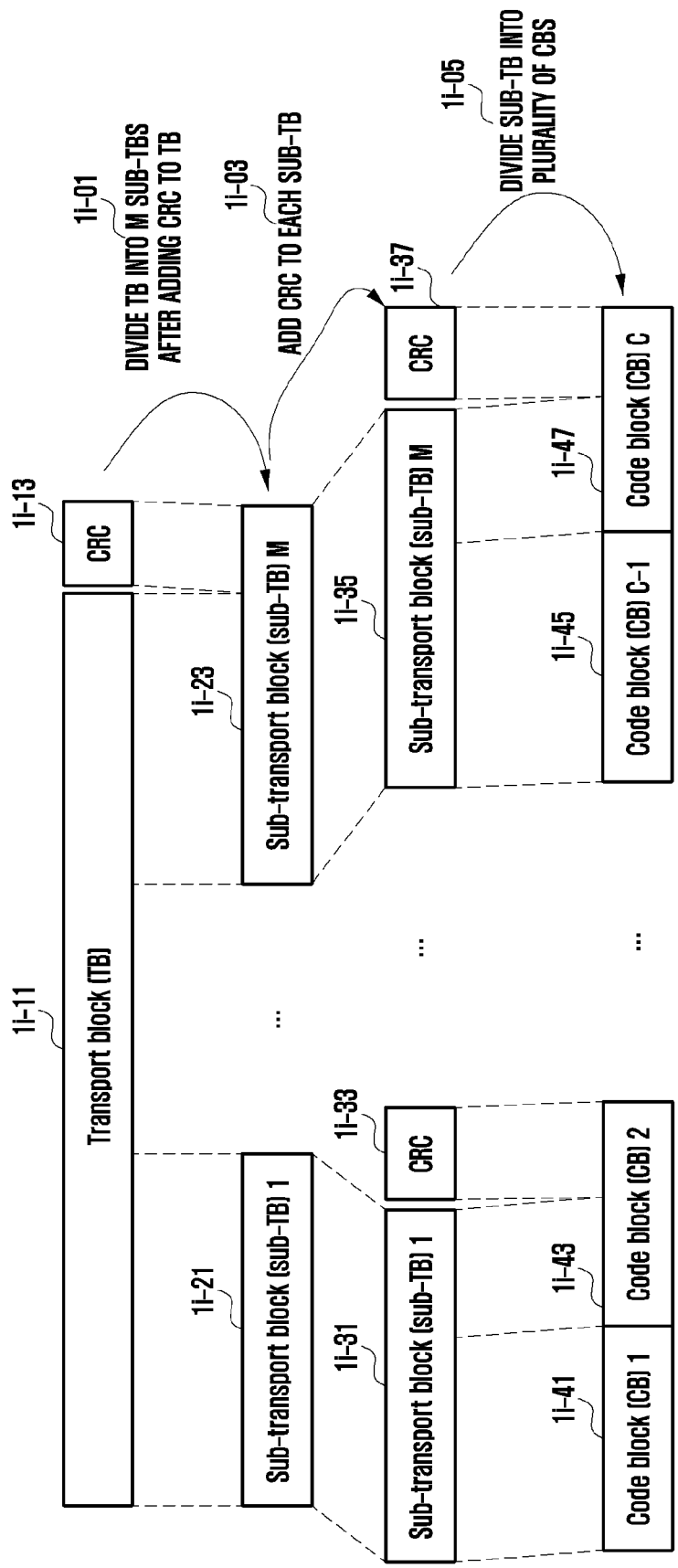
FIG. 1I is a view illustrating an example of a structure for a method for constituting a sub-TB and a CB and adding a CRS of the disclosure.

FIGS. 1G, 1H, and 1I are views illustrating modifications of the method provided in FIG. 1F. Although all of the CRC 1f-13 of the TB, the CRCs 1f-33 and 1f-37 of the sub-TBs, and the CRCs 1f-52, 1f-54, 1f-56, and 1f-58 of the CBs are used, the CRC of the TB is not added in FIG. 1G. This may be for lowering CRC overhead. Further, a CRC is not added to the sub-TB in FIG. 1H, and a CRC is not added to the CB in FIG. 1I. The sub-TB may be a code block group (CBG).

Figure 1J:
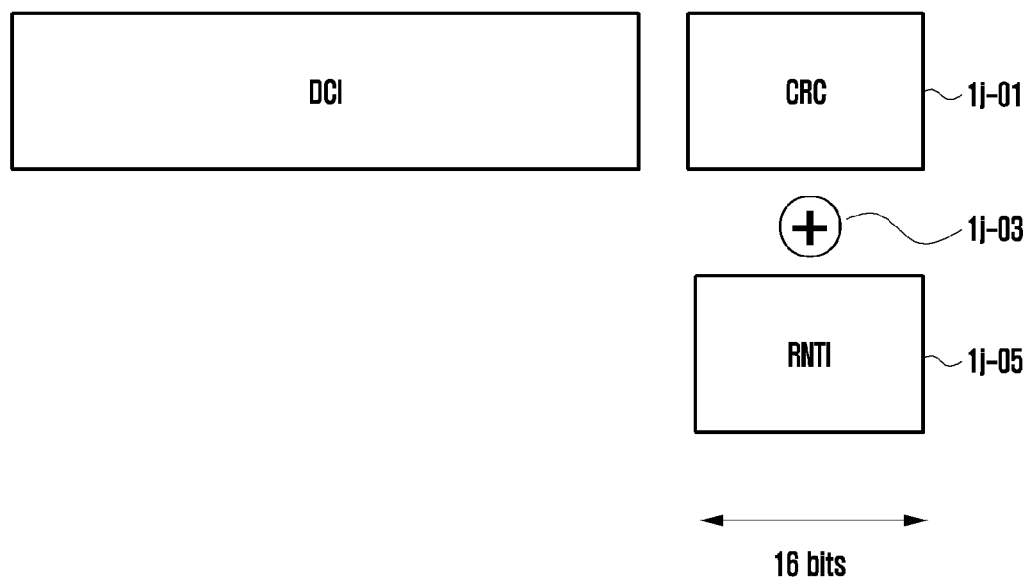
FIG. 1J is a view illustrating that an RNTI is masked by a CRC of a control signal in a conventional LTE system.

FIG. 1J is a view illustrating a method for classifying, by a UE, control signals of its own by allocating an RNTI of the length of 16 bits to the UE and masking the allocated RNTI value to a control signal to transmit the control signal in a conventional LTE system. A CRC of 16 bits is added to a final part of the downlink control information DCI (1j-01), and an RNTI value of 16 bits is added to the CRC through an XOR calculation (1j-03) (1j-05). The RNTI value may be used for classifying UEs or the purposes of control signals. For example, the UE may know an SI-RNTI value, and the SI-RNTI value may be used for detecting a control signal for transmission of system information. In the above-description, the fact that the RNTI is used for detecting a control signal may mean that, when a CRC is identified after decoding of the control signal, a CRC may be made with respect to the result of masking the RNTI value again, so as to determine whether the masking is successful. Because an RNTI of a total of 16 bits is used, the number of the values that may be allocated to users may be $2^{16}=65536$ and it is impossible for one base station to support 65536 UEs or more.

An eMBB service, which will be described below, will be referred to as a first type service, and data for an eMBB will be referred to as first type data. The first type service or the first type data is not limited to the eMBB, and may correspond to a case in which high-speed data transmission is required or wide-band transmission is required. Further, a URLLC service will be referred to as a second type service, and data for an URLLC will be referred to as second type data. The second type service or the second type data is not limited to the URLLC, and may correspond to a case in which a low latency is required or high-reliability transmission is necessary or another system that requires both a low latency and a high reliability. Further, an mMTC service will be referred to as a third type service, and data for an mMTC will be referred to as third type data. The third type service or the third type data is not limited to the mMTC, and may correspond to a case in which a low speed, a wide coverage, or a low power is required. Further, when the embodiment is described, it may be understood that the first type service may or may not include the third type service.

The structures of physical layer channels used for respective types to transmit three kinds of services or data may be different. For example, at least one of the lengths of transmission time intervals TTI, allocation units of frequency resources, structures of control channels, and mapping methods of data may be different.

Although three kinds of services and three kinds of data have been described, a larger kinds of services and data corresponding thereto may be present and even in this case, the contents of the disclosure may be applied.

In order to describe the method and the device suggested in the embodiment, the terms of a physical channel and a signal in a conventional LTE or LTE-A system will be used. However, the contents of the disclosure may be applied to a wireless communication system other than the LTE and LTE-A systems.

As described above, the embodiment suggests a detailed method for defining signal transmitting and receiving operations of a UE and a base station for transmitting the first type, second type, third type services or data, and operating the UEs that receive different types of services or data scheduling in the same system. In the disclosure, the first type, second type, and third type UEs indicate UEs that receive the first type, second type, and third type services or data scheduling. In the embodiment, the first type UE, the second type UE, and the third type UE may be the same UE or may be different UEs.

Hereinafter, embodiments of the disclosure will be described in detail with reference to the accompanying drawings. In the following description of the disclosure, a detailed description of known functions or configurations incorporated herein will be omitted when it may make the subject matter of the disclosure rather unclear. The terms which will be described below are terms defined in consideration of the functions in the disclosure, and may be different according to users, intentions of the users, or customs. Therefore, the definitions of the terms should be made on the basis of the contents throughout the specification. Hereinafter, the base station is a subject that performs allocation of resources of the UE, and may be at least one of eNode B, Node B, a base station (BS), a wireless connection unit, a base station controller or a node on a network. The UE may include a user equipment, a Mobile Station (MS), a cellular phone, a smartphone, a computer or a multimedia system that may perform communication functions. In the disclosure, the downlink DL is a wireless transmission path of a signal transmitted to the UE by the base station, and the uplink UL is a wireless transmission path of a signal transmitted to the base station by the UE. Further, although the embodiment will be described while taking an LTE or LTE-A system as an example, the embodiment of the disclosure may be applied to other communication systems having a similar technical background for channel form. For example, the 5-G mobile communication technology (new radio: NR) developed after the LTE-A may be included in the communication system. Also, embodiments of the disclosure may be modified without departing from the scope of the disclosure, and may be applied to other communication systems, on the basis of the determination by those skilled in the art.

In the disclosure, a transmission time interval TTI may mean a unit for transmission of a control signal and a data signal, or may mean a unit for transmission of a data signal. For example, a transmission time interval in a downlink of an existing LTE system is a subframe that is a time unit of 1 ms. Meanwhile, in the disclosure, a transmission time interval in an uplink may mean a unit for transmission of a control signal or a data signal, or may mean a unit for transmission of a data signal. A transmission time interval in an uplink of an existing LTE system is a subframe that is a time unit of 1 ms, which is the same as the time unit of the downlink.

Meanwhile, one of important references of the performance of a cellular wireless communication system is packet data latency. To achieve this, the LTE system transmits and receives signals in units of subframes having a transmission time interval (TTI) of 1 ms. The LTE system operated in this way may support a UE (short-TTI UE) having a transmission time interval that is shorter than 1 ms. Meanwhile, in an NR that is a 5G mobile communication system, the transmission time interval may be shorter than 1 ms. The short-TTI is expected to be suitable for services, such as a Voice over LTE (VoLTE) service or a remote control, for which latency is important. Further, in a cellular base, the short-TTI is expected as means for implementing Internet of Things (IoT) that is mission critical.

In the disclosure, the terms of a physical channel and a signal in the conventional LTE or LTE-A system also may be used as the terms of data or a control signal. For example, a PDSCH is a physical channel through which normal-TTI data are transmitted, but the PDSCH may be normal-TTI data in the disclosure.

Hereinafter, in the disclosure, an uplink scheduling approval signal and a downlink data signal will be referred to as a first signal. Further, in the disclosure, HARQ ACK/NACK for an uplink data signal and a downlink data signal for approval of uplink scheduling will be referred to as a second signal. In the disclosure, among signals that are transmitted from a base station to a UE, a signal that expects a response from the UE may be a first signal and a response signal of the UE corresponding to the first signal may be a second signal. Further, in the disclosure, the kinds of the services of a first signal may pertain to categories such as an eMBB, an eMTC, and a URLLC.

Hereinafter, in the disclosure, the length of the TTI of the first signal means the length of a period of time for which the first signal is transmitted. Further, in the disclosure, the length of the TTI of the second signal means the length of a period of time for which the second signal is transmitted. Further, in the disclosure, a second signal transmission timing is information on when the UE transmits the second signal and when the base station receives the second signal, and may be mentioned as a second signal transmission/ reception timing.

In the disclosure, when there is no mention about a TDD system, an FDD system will be generally described. However, the method and the device of the disclosure in an FDD system also may be applied to a TDD system according to a simple modification.

Hereinafter, higher signaling in the disclosure refers to a signal transmission method of transmitting a signal from the base station to the UE by using a downlink data channel of the physical layer or from the UE to the base station by using an uplink data channel of a physical layer, and may be mentioned as RRC signaling or an MAC control element (CE).

Hereinafter, in the disclosure, a sending end may indicate a base station in a downlink and a UE in an uplink. Further, the receiving end may mean a UE in a downlink and a base station in an uplink.

First Embodiment

Figure 1K:
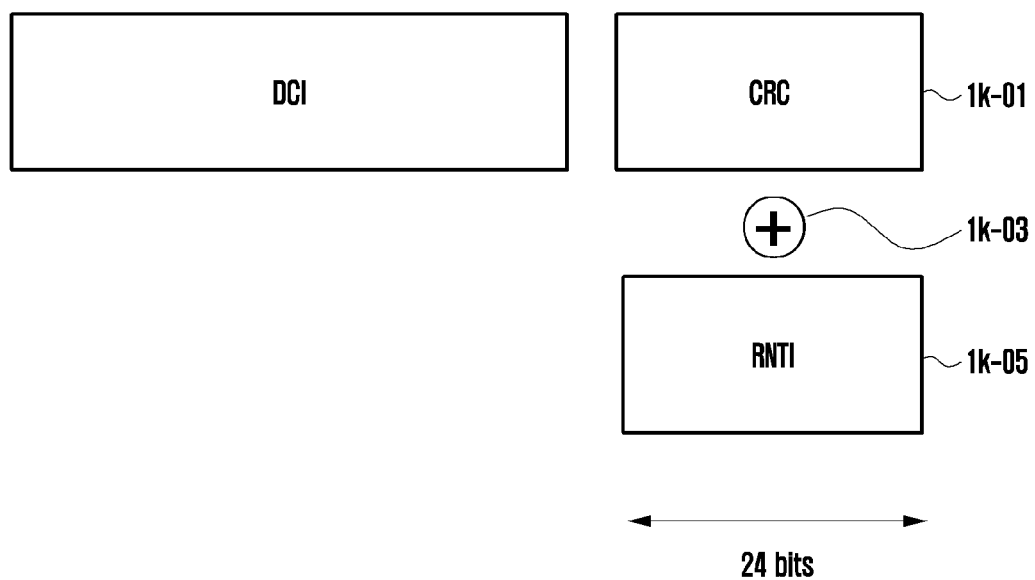
FIG. 1K is a view illustrating an example of a terminal classifying method according to a first embodiment.

The first embodiment describes a method for classifying, by a UE, a control signal of its own by allocating an RNTI of a length of more than 16 bits to the UE, masking the allocated RNTI value to the control signal, and transmitting the control signal with reference to FIG. 1K.

A CRC of a length of more than 16 bits, for example, 24 bits is added to a final part of downlink control information (1k-01), and a portion of the 24 bit RNTI value or a portion of the RNTI corresponding to 24 bits is added to the CRC through an XOR calculation 1k-03 (1k-05). The RNTI value may be used for classifying UEs or the purposes of control signals. For example, the UE may know an SI-RNTI value, and the SI-RNTI value may be used for detecting a control signal for transmission of system information. In the above-description, the fact that the RNTI is used for detecting a control signal may mean that, when a CRC is identified after decoding of the control signal, a CRC may be made with respect to the result of masking the RNTI value again, so as to determine whether the masking is successful. Because an RNTI value of a total of 24 bits is used, the number of values that may be allocated to users may be $2^{24}=16,777,216$.

The RNIT of a length of more than 16 bits may be used provision of a third type service or transmission of third type data.

Second Embodiment

Figure 1L:
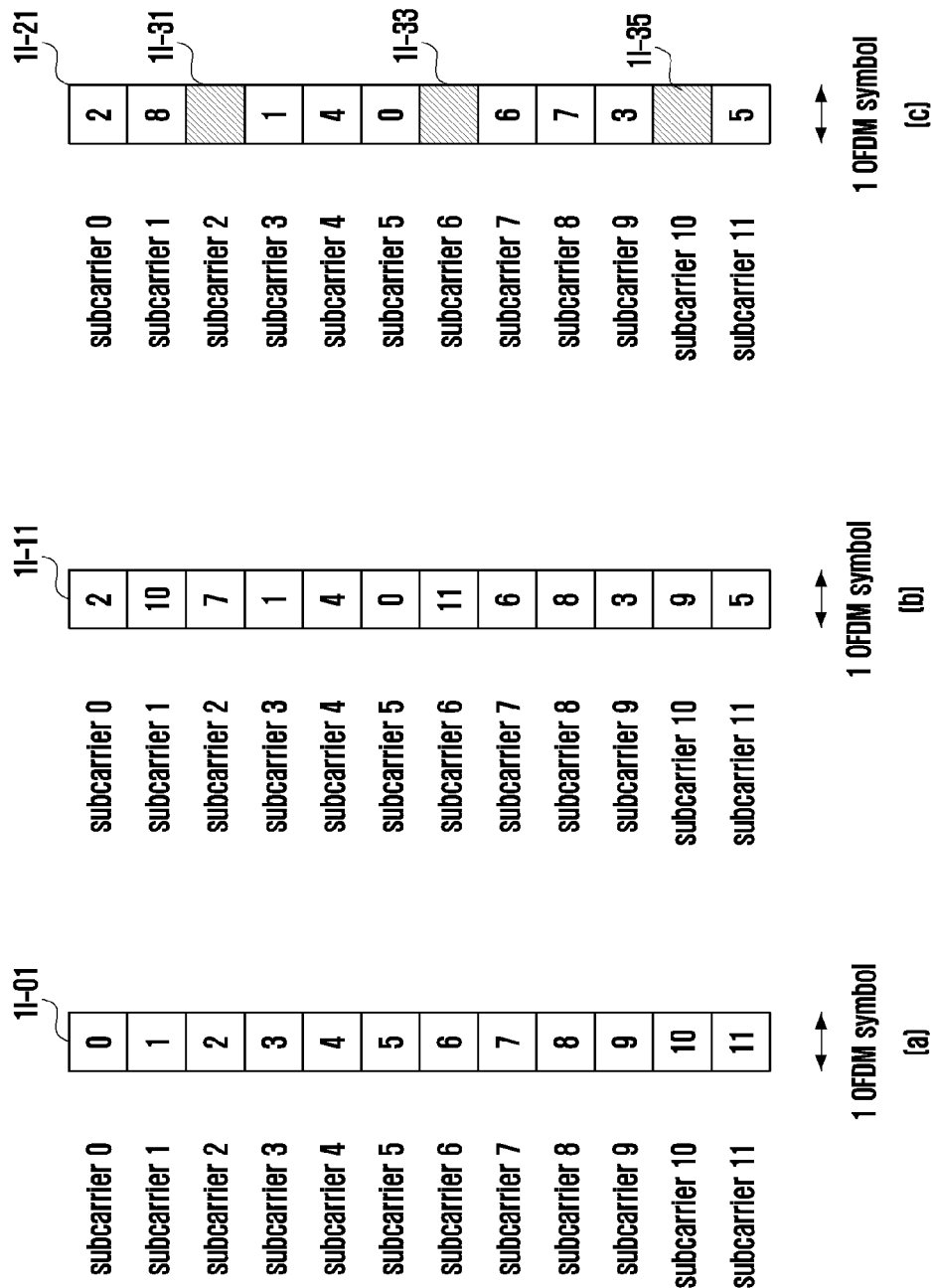
FIG. 1L is a view illustrating an example of a terminal classifying method according to a second embodiment.
Figure 1L:
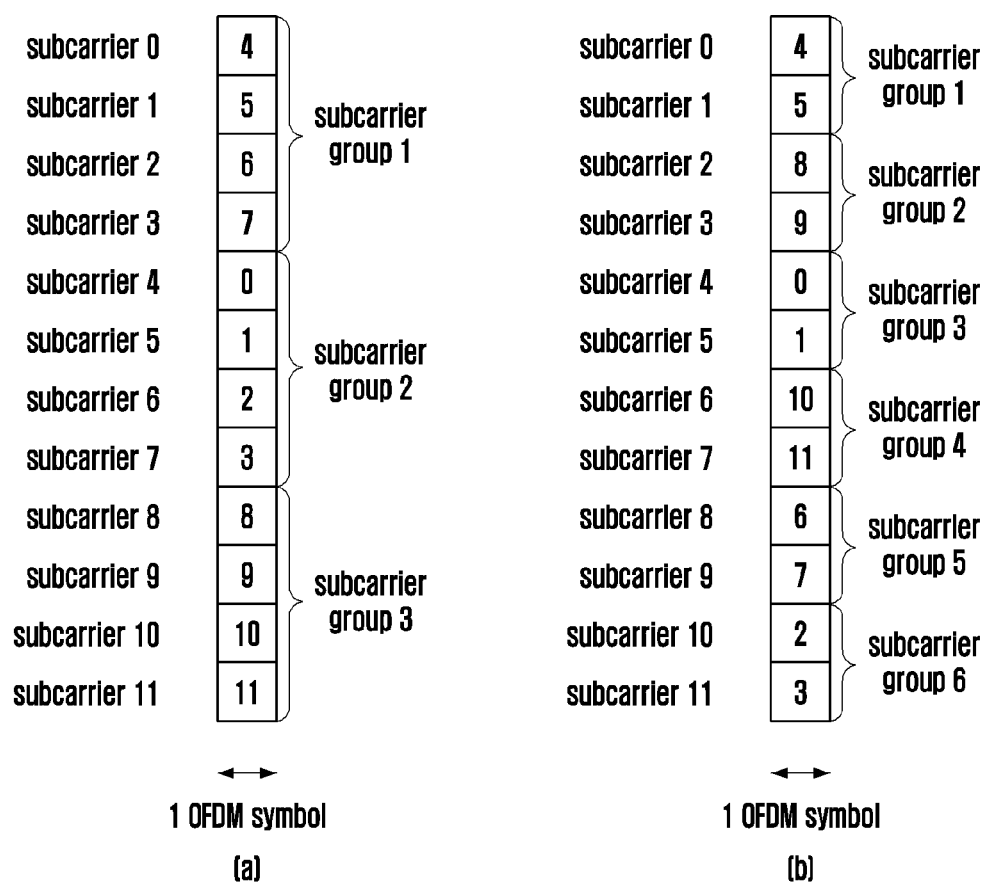

The second embodiment describes a method for classifying UEs by making the order of mapping control signals or data in a specific resource block different for UEs with reference to FIG. 1L. That is, a method for mapping control signals and data signals for classifying users is suggested.

In order to map control signals, a resource element group (REG), a control channel element (CCE), a PDCCH, and the like may be defined. The REG may include several REs, and as an example, may be a bundle of REs including twelve continuous subcarriers in one OFDM symbol. That is, the twelve continuous REs may constitute one REG. The CCE may be defined as a bundle of several REGs, and one PDCCH may be mapped to several CCEs. The method for mapping a control signal or a data signal, which is to be described in the present embodiment, may mean the order of mapped REs when a control signal is mapped with one REG or in a PRB including twelve subcarriers. Further, the method may mean the order of mapped REGs among several REGs constituting one CCE, or may mean the order of mapped CCEs among several CCEs constituting one PDCCH. Although the present embodiment is described by using the order of the REs, in which signals are mapped, in one REG, the disclosure is not necessarily applied only to the order of the REs mapped in one REG. In the present embodiment, the above-described mapping order may be also called the RE mapping order in an REG or an REG mapping order.

FIG. 1LA is an example of a conventional system for sequentially mapping control signals and data in twelve subcarriers that are present in one OFDM symbol of one PRB or one REG. FIG. 1L-01 illustrates the order of mapping the encoded QPSK, 16QAM, 64QAM, 256QAM, 1024QAM, and the like of control signals and data signals are mapped in one PRB. The mapping orders may be differently determined for UEs, and the UEs may be informed of the mapping orders. For example, the ones sequentially mapped with the twelve subcarriers are mapped in the order of the subcarriers 5, 3, 0, 9, 4, 11, 7, 2, 8, 10, 1, and 6 as in FIG. 1LB. 1*l*-11 denotes the order of mapping, by a specific UE, control signals and data signals in one PRB. If a reference signal is mapped with the twelve subcarriers in the PRB, only the subcarriers, except for the subcarriers mapped in FIG. 1LC, may be mapped in the order. FIG. 1LC is an example of mapping an RS in the subcarriers 2, 6, and 10 (1*l*-31, 1*l*-33, and 1*l*-35). Accordingly, in this case, the control signals and the data signals may be mapped in the orders allocated to the remaining subcarriers in advance.

FIG. 1LA is a method which is used for the purpose of using a mapping order for defining groups of subcarriers and indicating the order of the groups. In one subcarrier group, signals are sequentially mapped from the smaller numbers of the subcarriers. FIG. 1LAA is a view illustrating an example of a method for dividing one REG into three subcarrier groups and delivering the orders of the tree subcarriers to the UEs through higher signaling or some bits of the RNTI, and sequential mapping is performed in one subcarrier group when a signal is to be mapped with one REG or twelve subcarriers. FIG. 1LAB is a view illustrating an example of a method for dividing one REG into six subcarrier groups and delivering the orders of the three subcarriers to the UEs through higher signaling or some bits of the RNTI, and sequential mapping is performed in one subcarrier group when a signal is to be mapped with one REG or twelve subcarriers.

The base station delivers information of the mapping order to the UE through the higher signaling of 1*m*-01. The information on the mapping order is information on the twelve subcarriers, and may be used for respective PRBs or the order information of the four subcarriers may be continuously repeated. That is, the order is determined in the four subcarriers, and the group of the four subcarriers may be sequentially mapped. When a control signal and a data signal are transmitted to a specific UE, they are mapped with a resource according to the preset order (1m-03).

The UE may use the information on the received mapping order in encoding and decoding the control signal or the data signal.

In the disclosure, the information on the mapping order, which is assumed in decoding by the UE, is not separately received by the base station but may be obtained from a C-RNTI value of its own, which has been already allocated. For example, an RNTI of 24 bits is allocated, and among the 24 bits, the most significant (or most left side) 5 bits or the least significant (or most right side) 5 bits are interpreted as information on the mapping order. Thereafter, the remaining 19 bits may be used through the method in which they are masked in a CRC added to a DCI that is downlink control information. The number of bits is an example suggested to help convenience of description, and the number of bits may be applied differently. As an example, an RNTI of a total of 20 bits may be configured in the UE, among the 20 bits, four bits may be interpreted as information that indicates an RE mapping order in an REG, and the remaining 16 bits may be used for masking the RNTI in a CRC added to a DCI.

Figure 1M:
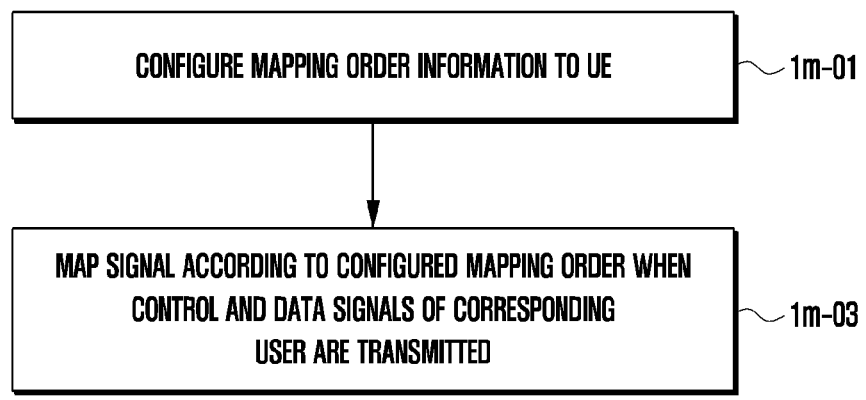
FIG. 1M is a view illustrating a procedure of a sending end according to the second embodiment.
Figure 1M:
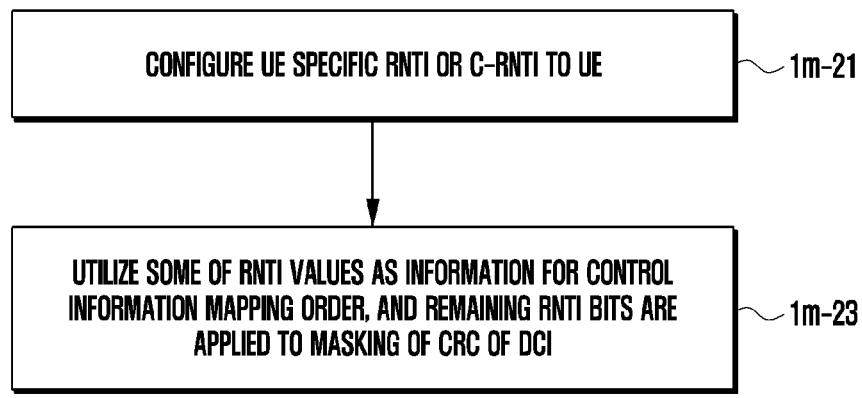

FIG. 1MA is a view illustrating a procedure which is used for the purpose of allocating an RNTI to a UE and indicating REG mapping order information. The base station configures an RNTI value to a UE first (1m-21). If the RNTI is configured to the UE, a portion of the RNTI value is utilized as information for the REG mapping order, and the remaining bits are used for making the RNTI in a CRC of a DCI of 1m-23.

Although the UE specific control information has been assumed and described, a method for detecting, by the UE, control information by utilizing the mapping order may be applied to a group specific control signal or a common specific control signal delivered to one or more UEs as well as UE specific control information and data. In this case, several UEs may configure an RNTI value to recognize the common REG mapping order, or one or more UEs may appropriately detect the group specific control information or the common control information by delivering the mapping order through the higher signaling.

Third Embodiment

The third embodiment describes a method for dividing the RNTI allocated to the UE into two parts, masking one part in an CRC of a DCI, and masking the remaining part in a TB of data or a CRC of a CB to allow the UE to classify a control signal and a data signal of its own with reference to FIG. 1N.

The base station allocates one RNTI value to the UE (1n-01). The RNTI is divided into two parts, which are regarded as RNTI 1 1n-03 and RNTI 2 1n-05. RNTI 1 1n-03 is masked in the CRC of the control signal DCI 1n-07, and RNTI 2 1n-05 is masked in the CRC of data signal code blocks 1n-09.

Fourth Embodiment

The fourth embodiment describes a method for dividing the RNTI allocated to the UE into two parts, masking one part in a CRC of the first DCI, and masking the remaining part in a CRC of the second DCI to allow the UE to classify the control signals of its own with reference to FIG. 1O.

The base station allocates one RNTI value to the UE (1o-01). The RNTI is divided into two parts, which are regarded as RNTI 1 (1o-03) and RNTI 2 (1o-05). RNTI 1 1o-03 is masked in the CRC of the first control signal DCI 1 1o-07, and RNTI 2 1o-05 is masked in the CRC of the second control signal DCI 2 1o-09.

Figure 1P:
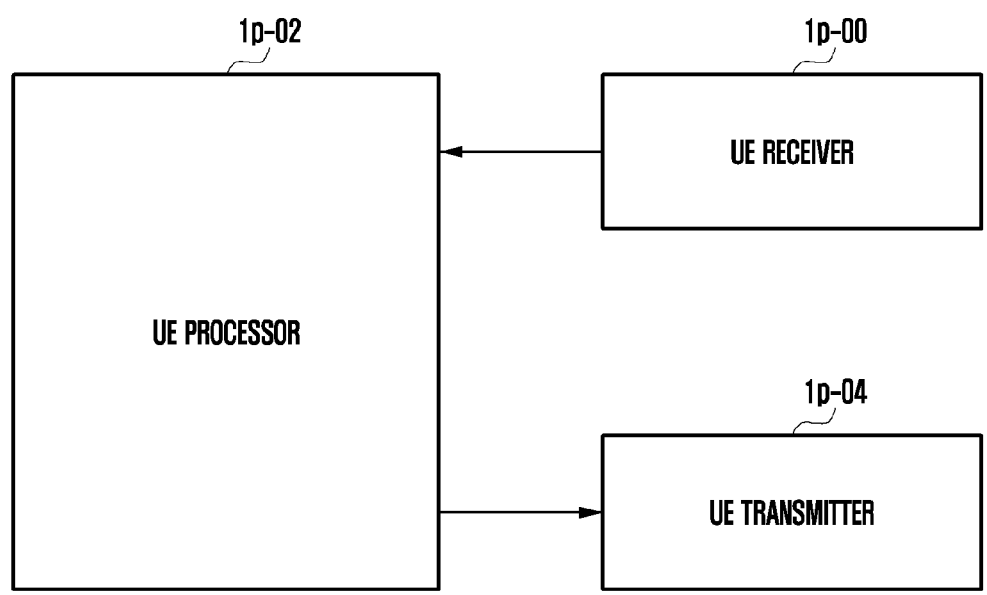
FIG. 1P is a view illustrating an internal structure of a terminal according to embodiments of the disclosure.
Figure 1Q:
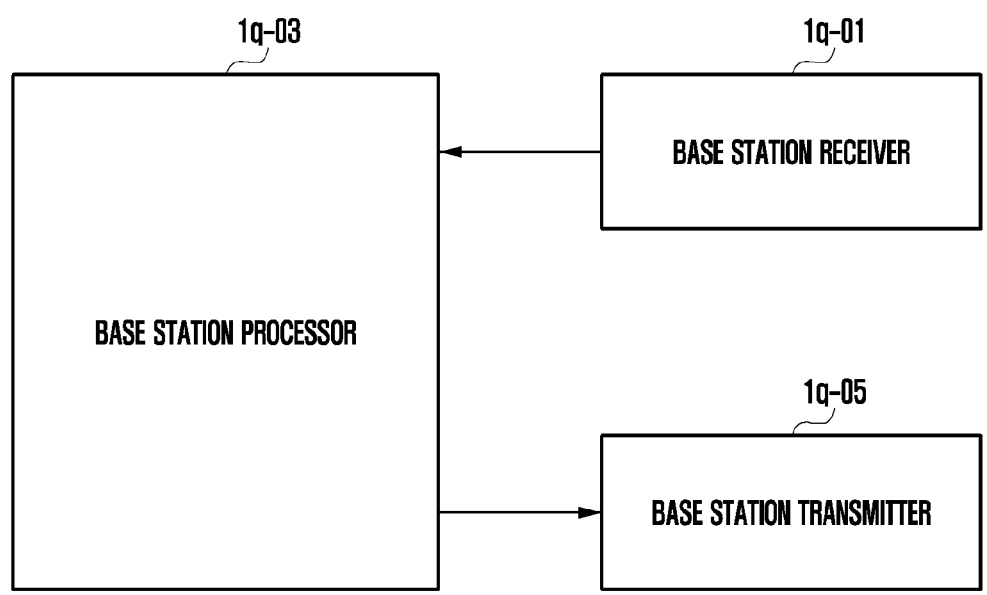
FIG. 1Q is a view illustrating an internal structure of a base station according to embodiments of the disclosure.

To perform the embodiments of the disclosure, transmitters, receivers, and processors of the UE and the base station are illustrated in FIG. 1P and FIG. 1Q, respectively. The first to fourth embodiments illustrate a method for transmitting and receiving signals between a base station and a UE to determine a method for identifying a UE to which a control signal and a data signal are transmitted and to perform an operation according to the identification. In order to perform this, the receivers, the processors, and the transmitters of the base station and the UE have to be operated according to the embodiment.

In detail, FIG. 1P is a block diagram illustrating an internal structure of a UE according to embodiments of the disclosure. As illustrated in FIG. 1P, the UE of the disclosure may include a UE receiver 1p-00, a UE transmitter 1p-04, and a UE processor 1p-02. The UE receiver 1p-00 and the UE transmitter 1p-04 are generally referred as a transceiver in the embodiment of the disclosure. The transceiver may transmit and receive a signal to/from a base station. The signal may include control information and data. To this end, the transceiver includes an RF transmitter that up-converts and amplifies a frequency of a transmitted signal, an RF receiver that low-noise amplifies a received signal and down-converts the frequency, and the like. Further, the transceiver may receive a signal through a wireless channel to output the signal to the UE processor 1p-02, and the UE processor 1p-02 may transmit the output signal to through the wireless channel. The terminal processor 1 may control a series of processes such that the terminal operates according to the above-described embodiments of the disclosure. For example, the UE receiver 1p-00 receive mapping order information from the base station and receives a downlink control and a data signal, the UE processor 1p-02 may perform a control for decoding according to the preset mapping order.

FIG. 1Q is a block diagram illustrating an internal structure of a base station according to embodiments of the disclosure. As illustrated in FIG. 1Q, the base station of the disclosure may include a base station receiver 1q-01, a base station transmitter 1q-05, and a base station processor 1q-03. The base station receiver 1q-02 and the base station transmitter 1q-05 are generally referred as a transceiver in the embodiment of the disclosure. The transceiver may transmit and receive a signal to/from a terminal. The signal may include control information and data. To this end, the transceiver includes an RF transmitter that up-converts and amplifies a frequency of a transmitted signal, an RF receiver that low-noise amplifies a received signal and down-converts the frequency, and the like. Further, the transceiver may receive a signal through a wireless channel to output the signal to the base station processor 1q-03, and the base station processor 1q-03 may transmit the output signal to through the wireless channel. The base station processor 1 may control a series of processes such that the base station operates according to the above-described embodiments of the disclosure. For example, the base station processor 1q-03 may perform a control to determine the mapping order for each UE and configure a control signal and a data signal to transmit the control signal and the data signal while classifying the UEs. Thereafter, the base station transmitter 1q-05 allows the control signal and the data to be mapped in a preset order when the control signal and the data are transmitted and transmits the mapped control signal and data.

Embodiment B

In order to support transmission in downlink and uplink transmission channels in a wireless communication system, Downlink Control Information (DCI) related thereto is necessary. In the conventional LTE, DCI is transmitted through a Physical Downlink Control Channel (PDCCH) that is a separate physical channel, through which downlink control information is transmitted, and the PDCCH is transmitted for every subframe over the entire system band. Because one PDCCH transports one DCI message and a plurality of UEs are scheduled at the same time in a downlink and an uplink, a plurality of PDCCHs are transmitted at the same time in each cell. A Cell-specific Reference Signal (CRS) that is a cell common reference signal is used as a Reference Signal (RS) for decoding a PDCCH. The CRS are an always-on signal that is transmitted for every subframe over the entire band, and scrambling and resource mapping vary according to the identity (ID) of the cell. All the UEs that monitor the PDCCH estimate a channel by using the CRS and decode the PDCCH.

Unlike the conventional technology, the 5G wireless communication system aims to support not only a service requiring a high data rate but also a service having a very short latency and a service requiring a high connection density. The scenarios have to provide various services having different transmission/reception techniques and transmission/reception parameters in one system to satisfy various requirements and services of users, and it is important to design the scenarios such that an added service is not restricted by the current system in consideration of forward compatibility. Unlike the existing LTE, essentially, time and frequency resources have to be flexibly utilized in 5G. Among them, particularly in designing a control channel, it is one of the most important items to secure flexibility. For the purpose, in the 5G communication system, instead of a CRS that is one of the conventional always-on signals, a Demodulation Reference Signal (DMRS) may be transmitted as reference signal for decoding a downlink control channel.

In the 5G wireless communication system, the downlink control channel may be classified into a localized transmission scheme and a distributed transmission scheme according to a mapping scheme of a resource. Different transmission techniques may be applied to the transmission schemes, and thus, the UEs may have different pieces of DMRS configuration information. Further, in the 5G wireless communication system, as various services having different requirements are supported, the requirements for the downlink control channel may be different. For example, in order to support a service requiring a high reliability, different pieces of DMRS configuration information or transmission techniques corresponding thereto may be applied to the UEs. Accordingly, the disclosure provides a method for configuring a DMRS in various downlink control channel transmission environment, and operations of a base station and a UE.

A wireless communication system has developed to be a broadband wireless communication system that provides a high speed and high quality packet data service, like the communication standards of, for example, High Speed Packet Access (HSPA) of 3GPP, Long Term Evolution (LTE) or evolved universal terrestrial radio access (E-UTRA), LTE-advanced (LTE-A), High Rate Packet Data (HRPD) of 3GPP2, Ultra Mobile Broadband (UMB), and 802.16e of IEEE, or the like, beyond the voice-based service provided at the initial stage.

An LTE system, which is a representative example of the broadband wireless communication system, employs an Orthogonal Frequency Division Multiplexing (OFDM) scheme for a downlink (DL), and employs a Single Carrier Frequency Division Multiple Access (SC-FDMA) scheme for an uplink (UL). An uplink means a wireless link, through which a User Equipment (UE) or a Mobile Station (MS) transmits a data or control signal to a base station (an eNode B or a base station (BS)), and a downlink is a wireless link, through which a base station transmits a data or control signal to a UE. In the multiple access schemes as described above, time-frequency resources for carrying data or control information are allocated and operated in a manner to prevent overlapping of the resources, i.e., to establish the orthogonally, between users, so as to identify data or control information of each user.

As a post communication system of LTE, the 5G communication system has to freely reflect various requirements such as a user and a service provider, a service that satisfies all of various requirements has to be supported. Services considered for the 5G communication system include an enhanced Mobile Broadband (eMBB), a massive machine type communication (mMTC), and an Ultra Reliability Low Latency Communication (URLLC).

The eMBB aims to provide an improved data rate as compared with a data rate supported by existing LTE, LTE-A, or LTE-Pro. For example, in the 5G communication system, in an aspect of one base station, the eMBB has to provide a peak data rate of 20 Gbps in the downlink, and a peak data rate of 10 Gbps in the uplink. Further, the 5G communication system has to provide a peak data rate and provide an increased user perceived data rate of a UE as well. In order to satisfy the requirements, improvement of various transmission/reception technologies including a further improved Multi Input Multi Output (MIMO) transmission technology is required. Further, as the current LTE transmits a signal by using a maximum transmission bandwidth of 20 MHz at a band of 2 GHz whereas the 5G communication system uses a frequency bandwidth that is wider than 20 MHz at a frequency band of 3 to 6 GHz or 6GH or more, the data rate required by the 5G communication system can be satisfied.

At the same time, an mMTC is considered to allow the 5G communication system to support an application service such as Internet of Things (IoT). The mMTC requires support of connection of a large-scale UE in a cell, improvement of coverage of a UE, an improved battery time, and decrease of costs of a UE to efficiently provide Internet of Thing. Because the Internet of Things is attached to various sensors and various devices to provide a communication function, a large number of UEs (e.g., 1,000,000 UEs/km2) have to be supported in a cell. Further, the UE supporting the mMTC has a high possibility of being located in a shaded area, such as the underground of a building, which is not covered by a cell due to the characteristics of the service, it requires a wider coverage as compared with another service provided by the 5G communication system. The UE supporting the mMTC has to be an inexpensive UE and the battery of the UE can hardly be exchanged frequently, a very long battery life time, such as 10 to 15 years, is required.

Finally, the URLLC is a mission-critical cellular-based wireless communication service. For example, services used for remote control of a robot or machinery, industrial automation, an Unmanned Aerial Vehicle, Remote Healthcare, and emergency alert, may be considered. Accordingly, the communication providing the URLLC has to provide a very low latency and a very high reliability. For example, the service supporting the URLLC has to satisfy a wireless connection latency (air interface latency) that is smaller than 0.5 milliseconds, and also has the requirements of a packet error rate of 10-5 or less. Accordingly, for a service supporting the URLLC, the 5G system has to provide a Transmission Time Interval (TTI) that is smaller than that of another service, and a design requirement of having to allocating a wide resource at a frequency band to secure the reliability of a communication link is required as well.

The three services of 5G, that is, the eMBB, the URLLC, and the mMTC may be multiplexed in one system and may be transmitted. Then, in order to satisfy the different requirements of the services, different transmission/reception techniques and transmission/reception parameters may be used for the services.

Hereinafter, the frame structures of the LTE and LTE-A systems will be described in more detail with reference to the drawings.

Figure 2A:
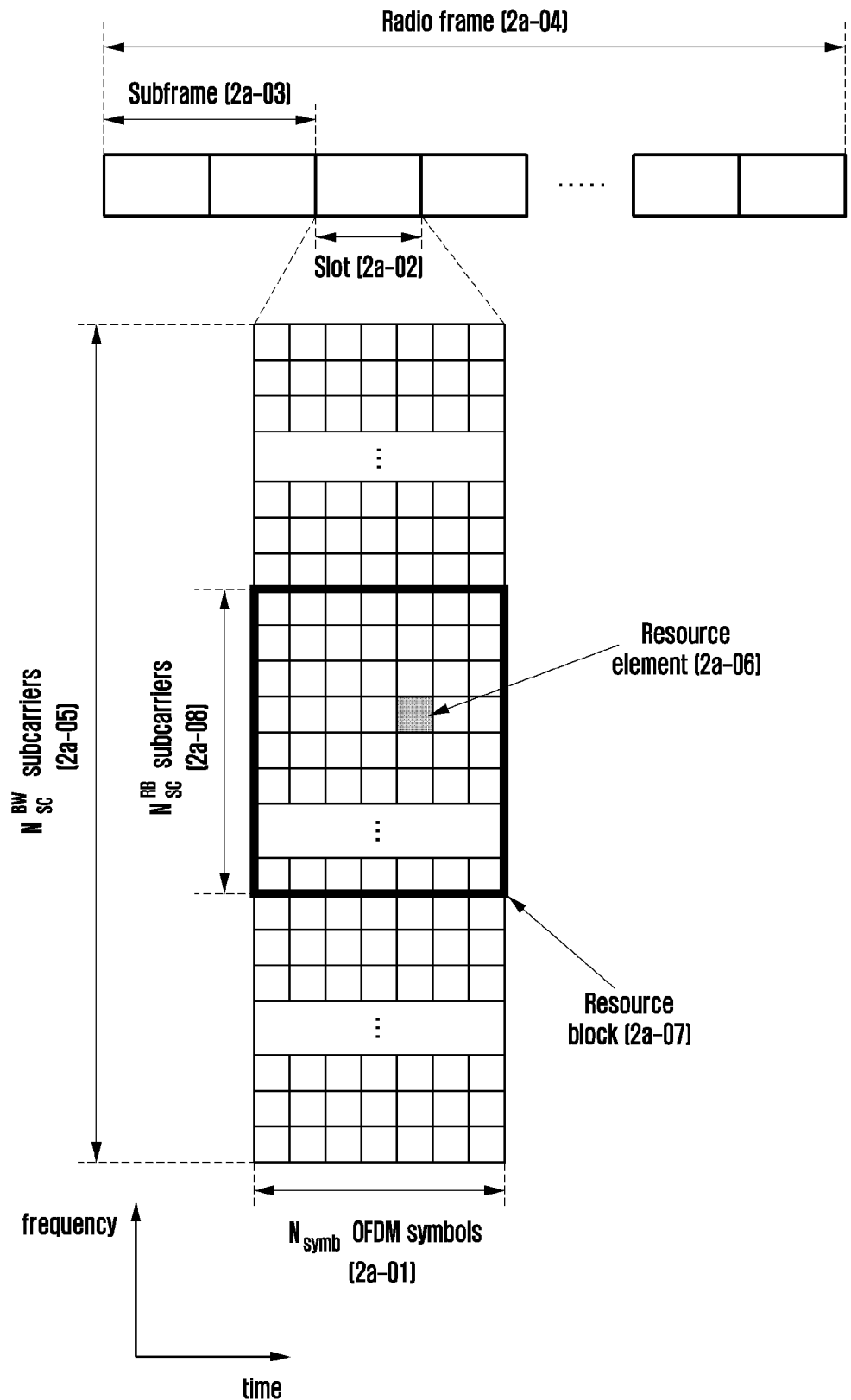
FIG. 2A is a view illustrating a basic structure of a time-frequency area in LTE.

FIG. 2A is a view illustrating the basic structure of the time-frequency domain, which is a radio resource region where data or a control channel is transmitted in a downlink of an LTE system.

Referring to FIG. 2A, the horizontal axis indicates the time domain, and the vertical axis indicates the frequency domain. The minimum transmission unit in the time area is an OFDM symbol, and $N_{symb}$ 2a-01 OFDM symbols constitute one slot 2a-02 and two slots constitute one subframe 2a-03. The length of one slot is 0.5 ms, and the length of one subframe is 1.0 ms. Further, the radio frame 2a-04 is a time area unit including ten subframes. The minimum transmission unit in the frequency area is a subcarrier, and the entire system transmission bandwidth includes a total of $N_{BW}$ (2a-05) subcarriers. In the time-frequency domain, the basic resource unit is a resource element (RE) 112, and an RE is expressed by an OFDM symbol index and a subcarrier index. The resource block (RB or Physical Resource Block: PRB) 2a-07 is defined by $N_{symb}$(2a-01) continuous OFDM symbols in a time area and $N_{RB}$(2a-08) subcarriers in a frequency area. Accordingly, one RB 2a-08 includes $N_{symb} \times N_{RB}$ REs 2a-06. Generally, the minimum transmission unit of data is an RB. In the LTE system, generally, $N_{symb}=7$ and $N_{RB}=12$. $N_{BW}$ is proportional to a system transmission bandwidth.

Figure 2B:
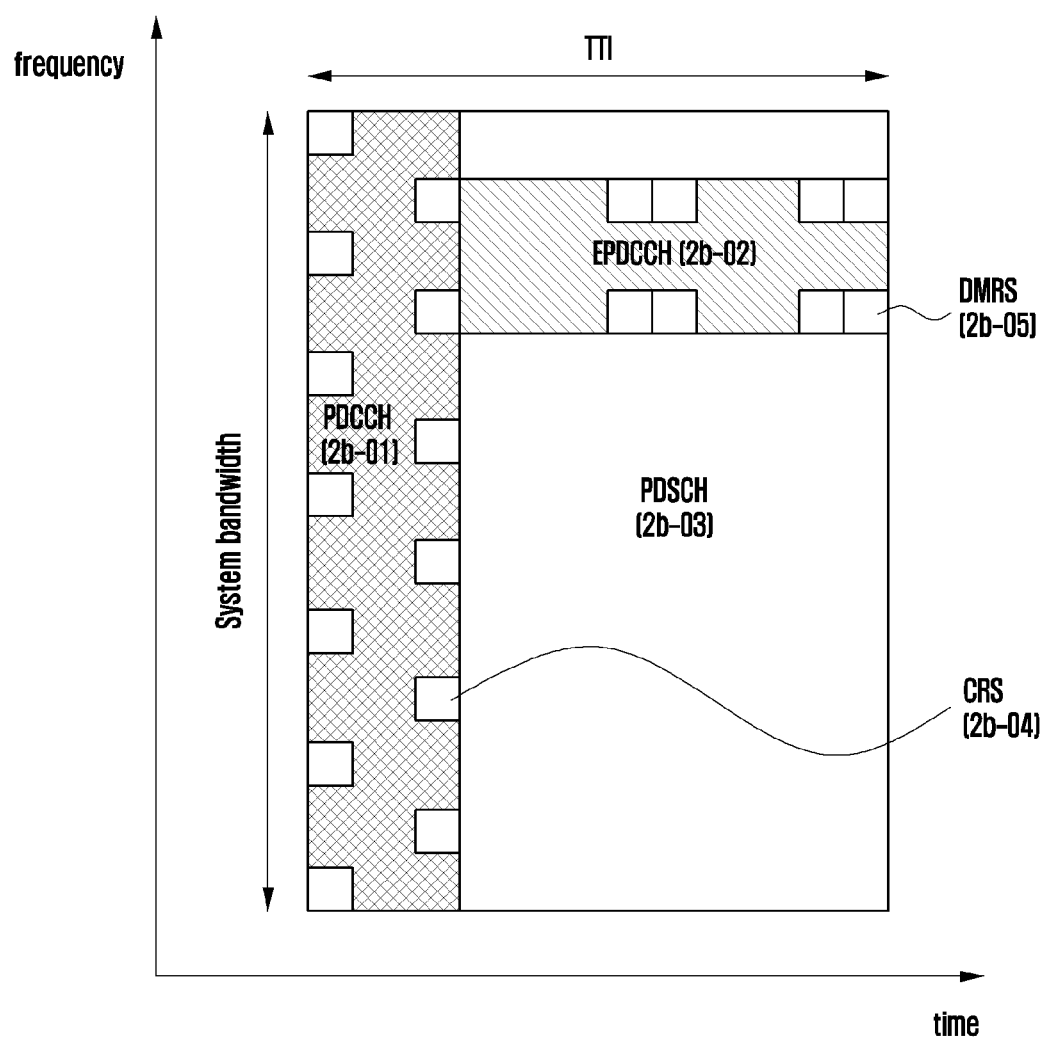
FIG. 2B is a view illustrating a PDCCH and an EPDCCH that are downlink control channels of LTE.

FIG. 2B is a view illustrating a PDCCH 2b-01 and an Enhanced PDCCH (EPDCCH) 2b-02 that are downlink physical channels, through which a DCI of the LTE is transmitted.

According to FIG. 2B, the PDCCH 2b-01 is time-multiplexed with the PDSCH 2b-03 that is a data transmission channel, and is transmitted over the system bandwidth. The area of the PDCCH 2b-01 is expressed by the number of OFDM symbols, and this is indicated to the UE as a Control Format Indicator (CFI) transmitted through a Physical Control Format Indicator Channel (PCFICH). The UE can decode allocation of downlink scheduling as quickly as possible by allocating the PDCCH 2b-01 to an OFDM symbol at a front part of a subframe, and through this, a decoding latency for a Downlink Shared Channel (DL-SCH), that is, an overall downlink transmission latency can be decreased. Because one PDCCH transports one DCI message and a plurality of UEs are scheduled at the same time in a downlink and an uplink, a plurality of PDCCHs are transmitted at the same time in each cell.

The CRS 2b-04 is used for a reference signal for decoding the PDCCH 2b-01. The CRS 2b-04 is transmitted for every subframe over the entire band, and scrambling and resource mapping vary according to a cell identity (ID). Because the CRS 2b-04 is a reference signal used in common by all the UEs, UE-specific beamforming cannot be used. Accordingly, a multiple antenna transmission technique for a PDCCH of LTE is confined to an open loop transmission diversity. The number of ports of the CRS is implicitly known to the UE from decoding of a Physical Broadcast Channel (PBCH).

The allocation of resources of the PDCCH 2b-01 is based on a Control-Channel Element (CCE), and one CCE includes nine Resource Element Groups (REGs), that is, a total of 36 Resource Elements (REs). The number of the CCEs that is necessary for a specific PDCCH 2b-01 may be 1, 2, 4, or 8, and this varies according to a channel coding rate of a DCI message payload. In this way, the different number of CCEs are used to realize link adaptation of the PDCCH 2b-01.

The UE has to sense a signal while not knowing information on the PDCCH 2b-01, LTE defined a search space that represents a set of CCEs for blinding decoding. The search space includes a plurality of sets at an aggregation level AL of each CCE, and this is not explicitly signaled but is implicitly defined through the function and the subframe number by the UE identity. The UE in each subframe decodes the PDCCH 2b-01 for all possible resource candidates that can be made from the CCEs in the configured search space, and processes information that is declared to be effective to the corresponding UE through identifying of a CRC.

The search space is classified into a UE-specific search space and a common search space. UEs of a specific group or all UEs may investigate a common search space of the PDCCH 2b-01 to receive cell common control information such as dynamic scheduling for system information or a paging message. For example, the scheduling allocation information of the DL-SCH for transmission of System information Block (SIB)-1 including business information of the cell may investigate and receive the common search space of the PDCCH 2b-01.

According to FIG. 2B, the EPDCCH (2b-02) is frequency-multiplexed with the PDSCH 2b-03 and is transmitted. The base station may appropriately allocate the resources of the EPDCCH 2b-02 and the PDSCH 2b-03 through scheduling, and thus, may effectively support coexistence with data transmission for an existing LTE UE. However, because the EPDCCH 2b-02 is allocated to the entire one subframe and is transmitted, there is a loss in an aspect of transmission latency. A plurality of EPDCCHs 2b-02 include one set of EPDCCHs 2b-02, and the set of EPDCCHs 2b-02 is allocated in units of Physical Resource Block (PRB) pair. Location information on the EPDCCH set is configured UE-specifically, and this is signaled through a Remote Radio Control (RRC). A maximum of two EPDCCH(2b-02) sets are configured in each UE, and one EPDCCH(2b-02) set may be simultaneously multiplexed to different UEs and be configured.

The allocation of the resource of the EPDCCH 2b-02 may be based on an Enhanced CCE (ECCE), one ECCE may include four or eight Enhanced REGs (EREGs), and the number of EREGs per ECCE varies according to the length of the CP and subframe configuration information. One EREG includes nine REs, and thus, sixteen EREGs may be present per RRB pair. The EPDCCH transmission scheme is classified into localized/distributed transmissions according to the RE mapping scheme of the EREG. The aggregation level of the ECCE may be 1, 2, 4, 8, 16, and 32, and this is determined according to the length of the CP, configuration of a subframe, an EPDCCH format, and a transmission scheme.

The EPDCCH 2b-01 supports only a UE-specific search space. Accordingly, the UE that is to receive a system message necessarily has to investigate a common search space on the existing PDCCH 2b-01.

Unlike the PDCCH 2b-01, the EPDCCH 2b-02 uses a Demodulation Reference Signal (DMRS) 2b-05 as a reference signal for decoding. Accordingly, the precoding for the EPDCCH 2b-02 may be configured by the base station, and UE-specific beamforming may be used. Through the DMRS 2b-05, the UEs may perform decoding for the EPDCCH 2b-02 even when they do not know which precoding is used. The EPDCCH 2b-02 uses the same pattern as the DMRS of the PDSCH 2b-3. However, unlike the PDSCH 2b-03, the DMRS 2b-05 in the EPDCCH 2b-02 can support transmission using a maximum of four antenna ports. The DMRS 2b-05 is transmitted only to the corresponding PRB, to which the EPDCCH is transmitted.

The port configuration information of the DMRS 2b-05 varies according to the transmission scheme of the EPDCCH 2b-02. In the localized transmission scheme, an antenna port corresponding to the ECCE, in which the EPDCCH 2b-02 is mapped, is selected on the basis of the ID of the UE. When different UEs share the same ECCE, that is, when multiuser MIMO transmission is used, the DMRS antenna port may be allocated to the UEs. The DMRS 2b-05 also may be shared and transmitted, and in this case, may be classified as a DMRS 2b-05 scrambling sequence configured through higher layer signaling. In the distributed transmission scheme, up to two antennal ports of the DMRS 2b-05 are supported, and a diversity technique in a precoder cycling scheme is supported. The DMRS 2b-05 may be shared for all REs transmitted in one PRB pair.

Until now, the downlink control channel transmission schemes in the conventional LTE and LTE-A, and the RS for decoding have been described.

Hereinafter, a downlink control channel in the currently discussed 5G communication system will be described in more detail with reference to the drawings.

Figure 2C:
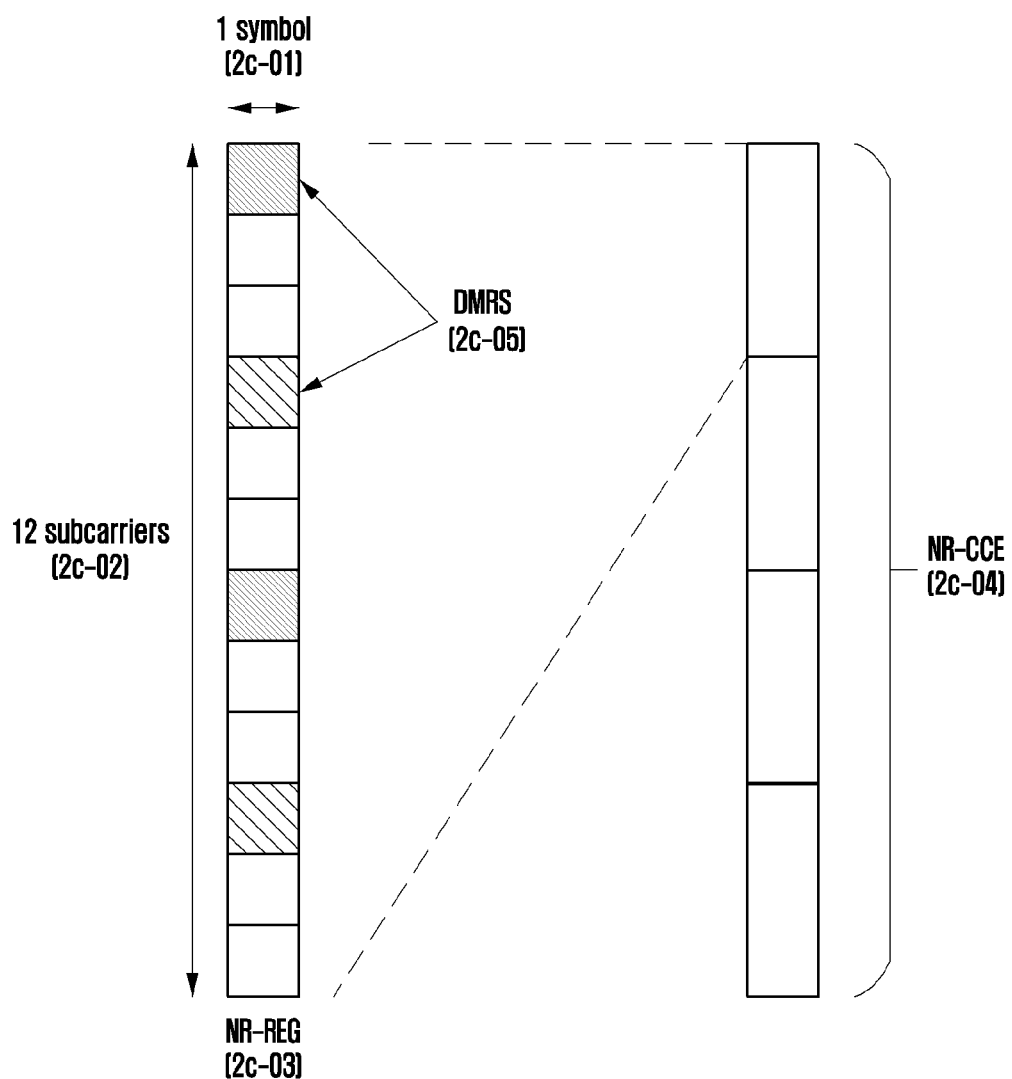
FIG. 2C is a view illustrating a 5G downlink control channel.

FIG. 2C is a view illustrating an example of a basic unit of a time and frequency resource constituting a downlink control channel that may be used in 5G. According to FIG. 2C, the basic unit (may be named REG, New Radio (NR)-REG, PRB, and the like, and hereinafter named NR-REG 2c-03 in the disclosure) of the time and frequency resource constituting a control channel has one OFDM symbol 2c-01 in the time axis and has twelve subcarriers 2c-02, that is, one RB in the frequency axis. As the time-axis basic unit is assumed as one OFDM symbol 2c-01 in configuring a basic unit of a control channel, a data channel and a control channel may be time-multiplexed in one subframe. Because a processing time of a user can be reduced by locating the control channel in front of the data channel, it is easy to satisfy the latency requirements. Frequency multiplexing between the control channel and the data channel can be more efficiently performed by configuring the frequency axis basic unit of the control channel to one RB 2c-02.

Control channel areas of various sizes may be configured by connecting the NR-REGs 2c-03 illustrated in FIG. 2C. As an example, when the basic unit, to which the downlink control channel is allocated in 5G, is the NR-CCE 2c-04, one NR-CCE 2c-04 may include a plurality of NR-REGs 2c-03. In a description of the NR-REG 2c-04 illustrated in FIG. 2C as an example, if the NR-REG 2c-03 includes twelve REs and one NR-CCE 2c-04 includes four NR-REGs 2c-03, this means that one NR-CCE 2c-04 may include 48 REs. If a downlink control area is configured, the corresponding area may include a plurality of NR-CCEs 2c-04, and a specific downlink control channel may be mapped with one or a plurality of NR-CCEs 2c-04 according to the aggregation level AL in the control area and be transmitted. The NR-CCEs 2c-04 in the control area may be classified by numbers, and then, the numbers may be given according to a logical mapping scheme.

The basic unit of the downlink control channel illustrated in FIG. 2C, that is, the NR-REG 2c-03 may include all of the REs with which the DCI is mapped, and an area in which the DMRS 2c-05 that is a reference signal for decoding is mapped. Then, the DMRS 2c-05 may be efficiently transmitted in consideration of an overhead according to allocation of an RS. For example, when the downlink control channel is transmitted by using a plurality of OFDM symbols, the DMRS 2c-05 may be transmitted only to the first OFDM symbol. The DMRS 2c-05 may be mapped in consideration of the number of antenna ports used to transmit the downlink control channel, and be transmitted. The drawing illustrated in FIG. 2C illustrates an example of using two antenna ports. Then, a DMRS 2c-06 transmitted for antenna port #0 and a DMRS 2c-07 transmitted for antenna #1 may be present. The DMRSs for different antenna ports may be multiplexed in various schemes. FIG. 2C illustrates an example of transmitting DMRSs corresponding to different antenna ports in different REs such that the DMRS are perpendicular to each other. In this way, the DMRSs may be FDMed and be transmitted, or may be CDMed and be transmitted. In addition, various forms of DMRS patterns may be present, and this may be associated with the number of antenna ports. Hereinafter, in a description of the disclosure, it is assumed that two antenna ports are used. The same principle in the disclosure may be applied to the number of two or more antenna ports.

FIG. 2D is a view illustrating an example of a scheme of mapping a downlink control channel in the 5G wireless communication system. In FIG. 2D, the resource area in which a downlink control channel may be transmitted may be defined as a control resource set 2d-03. The control resource set 2d-03 may be set to a specific sub-band 2d-20 in the entire system bandwidth 2d-10 in the frequency axis, and may be set to one or a plurality of OFDM symbols in the time axis. In FIG. 2D, it is assumed that one NR-CCE 2d-01 and 2d-02 includes four NR-REGs 2d-04.

In the localized mapping 2d-30 of FIG. 2D, the NR-CCEs 2d-01 and 2d-02 may be mapped with a plurality of NR-REGs connected to each other. Because the localized mapping 2d-30 scheme is integrated in the frequency axis, it is suitable for using UE-specific beamforming using sub-band precoding. Accordingly, it is suitable for transmitting a UE-specific downlink control channel. In the UE-specific beamforming, one port DMRS may be used. Further, the DMRS also has to be UE-specific to support the UE-specific beamforming. Accordingly, different UE have to use different DMRSs. To achieve this, a definition of DMRS port mapping for each UE is required. This will be additionally described in the following.

In the distributed mapping 2d-40 of FIG. 2D, the NR-CCEs 2d-01 and 2d-02 may be mapped with a plurality of NR-REGs 2d-04 distributed in the sub-band 2d-02 set to a control resource set 2d-03. The distributed mapping 2d-40 scheme is suitable for using a transmission diversity technique because it may sufficiently obtain a frequency diversity. According to the used transmission diversity technique, one port or two port MDRS may be used. Then, it is preferable that the used DMRS is shared by the UEs, and to achieve this, a DMRS sequence may be defined cell-specifically.

Until now, the downlink control channel structure and the resource allocation scheme that are suitable for the 5G wireless communication system has been described. The downlink control channel in 5G has to be flexibly allocated. For example, control channel area may be differently configured for UEs or UE-groups. The sizes of the control channel areas configured for the UEs/UE-groups may be determined according to various system parameters including service scenarios such as an eMBB, a URLLC, and an mMTC, various simultaneous supports of TTIs, services for different numerologies, and securing of forward compatibility. The size of the control channel area for the UE/UE-group may be configured through L1/L2 signaling such as a Radio Resource Control (RRC) or a common control signal, group common control signal.

As described above, the downlink control channel in the 5G wireless communication system may be classified into a localized mapping scheme and a distributed mapping scheme according to the mapping scheme of a resource, and different transmission techniques may be applied to the mapping schemes. Accordingly, the base station and the UE may have different pieces of DMRS configuration information according to the transmission techniques. Further, in the 5G wireless communication system, as various services having different requirements are supported, the requirements for the downlink control channel may be different. For example, in order to support a service requiring a high reliability, different pieces of DMRS configuration information or transmission techniques corresponding thereto may be applied to the UEs. Accordingly, the disclosure provides a method for configuring a DMRS in various downlink control channel transmission environment, and operations of a base station and a UE.

Hereinafter, exemplary embodiments of the disclosure will be described in detail with reference to the accompanying drawings. Here, it is noted that identical reference numerals denote the same structural elements in the accompanying drawings. Further, a detailed description of a known function and configuration which may make the subject matter of the disclosure unclear will be omitted.

Further, although the following detailed description of embodiments of the disclosure will be directed to the 3GPP LTE standard, it can be understood by those skilled in the art that the main gist of the disclosure may also be applied to any other communication system having similar technical backgrounds and channel formats, with a slight modification, without substantially departing from the scope of the disclosure.

First Embodiment

FIG. 2E is a view illustrating a method for configuring a DMRS of a downlink control channel according to the first embodiment of the disclosure.

FIG. 2E illustrates one NR-REG 2e-04, and illustrates an example of transmitting DMRSs 2e-01 and 2e-02 corresponding to two antennas ports. An example of FIG. 2E illustrates a method for mapping a DMRS corresponding to each antenna port to each UE in a UE-specific method. In the DMRS port configuration information of the downlink control channel, the UE may perform blinding decoding only when the UE is determined in advance or can be implicitly indicated from known information. For example, it may be obtained from information, such as an NR-REG index searched during blinding decoding, an NR-CCE index, an OFDM symbol index, a slot or subframe index, the number of all RE-REGs that are present in a control resource set, the number of all NR-CCEs that are present in the control resource set, an aggregation level, whether a time-first/frequency-first resource between an NR-REG and an NR-CCE is mapped, and whether the transmission scheme is a localized transmission scheme or a distributed transmission scheme. In a DMRS port configuration, a cell identity (ID) or virtual cell ID information may be additionally considered for a cell-specific (or UE group common) configuration, and a UE ID (e.g., RNTI) or a virtual UE ID may be additionally considered for a UE-specific configuration. This may be expressed in Equation 1.

Antenna port number=$f$(downlink control channel configuration information, a UE or cell identifier) [Equation 1]

In Equation 1, f(x,y) means a function for parameters x and y, and this may be expressed in various equations.

The drawing illustrated in FIG. 2E illustrates an example of a UE-specific DMRS port configuration. In the example of FIG. 2E, a DMRS 2e-01 corresponding to antenna port #0 2e-01 may be allocated to UE #1 2e-05, and a DMRS 2e-07 corresponding to antenna port #1 may be allocated to UE #2 2e-06. Further, the DMRSs 2e-01 and 2e-02 corresponding to antenna port #0 and antenna port #1 may be allocated to UE #3 2e-07. This may be calculated by using Equation 1. As in the example illustrated in FIG. 2E, the DMRS antenna ports of the UEs may be mapped orthogonally or non-orthogonally. In the non-orthogonal mapping, an interference may become random by using a UE-specific DMRS sequence.

The first embodiment has described the method for setting a DMRS port.

Hereinafter, a method for configuring a DMRS pattern after configuring a DMRS port will be described.

FIG. 2F is a view illustrating an embodiment of a DMRS pattern according to an embodiment of the disclosure, FIG. 2F illustrates one NR-REG 2f-30, and illustrates an example of transmitting DMRSs 2f-01 and 2f-02 corresponding to two antenna ports. Further, an example in which the DMRS corresponding to one antenna port is received for UEs is illustrated. When UE-specific beamforming is used in the above-described localized scheme, one port transmission may be performed. Further, when a transmission diversity transmission scheme, such as a precoder or cycling, is used in the distributed scheme, one port transmission may be performed. FIG. 2F illustrates an example in which UE #1 is mapped to antenna port #0 2f-01 and UE #2 is mapped to antenna port #1 2f-02. The antenna port mapping may be configured in the scheme as in the above-described first embodiment. The following embodiment of the disclosure considers that different DMRS patterns may be configured in the same DMRS antenna port mapping. FIG. 2F illustrates basic DMRS pattern #1 2f-04, and DMRS pattern #2 2f-05 and 2f-06 having different DMRS overheads. DMRS pattern #1 2f-04 illustrates a state in which DMRS 2f-01 corresponding to antenna port #0 is allocated to UE #1 according to the antenna port mapping in a basic DMRS pattern of the NR-REG 2f-30. Accordingly, because a DMRS for another UE (e.g., UE #2 2f-20 in FIG. 2F) may be transmitted in the DMRS 2f-02 RE corresponding to antenna port #1, UE #1 does not use the corresponding RE (2f-03). To the contrary, in DMRS pattern #2 2f-05 and 2f-06, the location of the DMRS 2*f*-02 corresponding to antenna port #1, that is, the RE corresponding to 2*f*-03 may be used for transmission of a DMRS or transmission of a DCI. In more detail, in DMRS pattern #2-1 2*f*-05, the RE 2*f*-03 that is not used in DMRS pattern #1 2*f*-04 may be used to additionally transmit the DMRS 2*f*-01 for antenna port #0. Accordingly, because DMRS pattern #2-1 2*f*-05 can have a DMRS density that is higher than that of DMRS pattern #1 2*f*-04 in the frequency axis, channel estimation performance can be better. DMRS pattern #2-2 2*f*-06 may be used as an additional RE for transmitting a DCI to an RE 2*f*-03 of DMRS pattern #1 2*f*-04, which is not used. Accordingly, DMRS pattern #2-2 2*f*-06 may be transmitted at a code rate that is lower than that of DMRS pattern #1 2*f*-04. In this way, a DMRS pattern that may have a better performance than DMRS pattern #1 2*f*-04 may be variously defined. Similarly, in the case of UE #2 2*f*-20, the RE 2*f*-03 that is not used in DMRS pattern #1 may be used for additional transmission (DMRS pattern #2-1) of the DMRS 2*f*-01 for antenna port #1 or transmission (DMRS #2-2) of a DCI.

The UE may implicitly know DMRS antenna port information through the first embodiment of the disclosure, and may receive a DMRS pattern for the corresponding port. Hereinafter, an operation of configuring a pattern of the above-described DMRS will be described. Hereinafter, in a description of the embodiments, FIG. 2F will be referenced. DMRS pattern #1 will be described as a first DMRS pattern, and DMRS pattern #2 will be described as a second DMRS pattern.

Second Embodiment

Figure 2G:
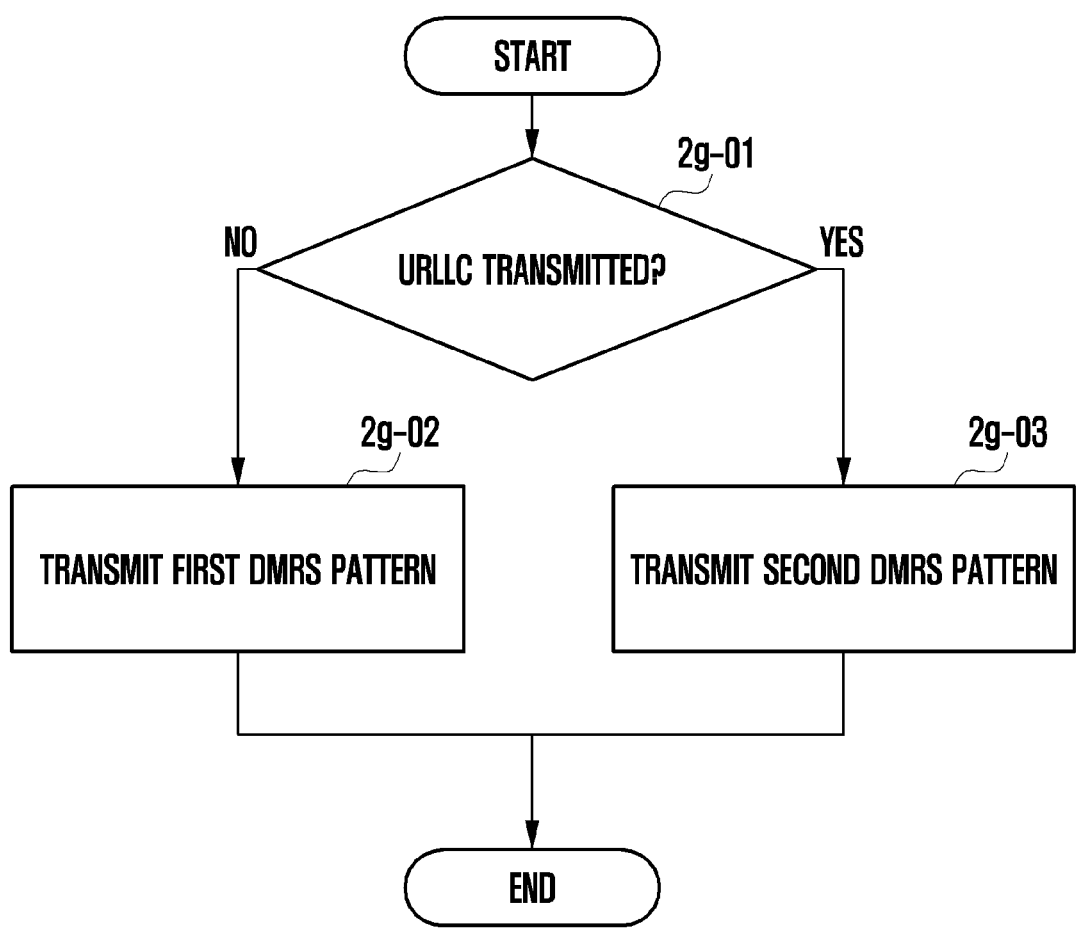
FIG. 2GA is a view illustrating a method for configuring a DMRS according to the second embodiment of the disclosure, and FIG. 2GB is a view illustrating a method for configuring a DMRS according to the second embodiment of the disclosure.
Figure 2G:
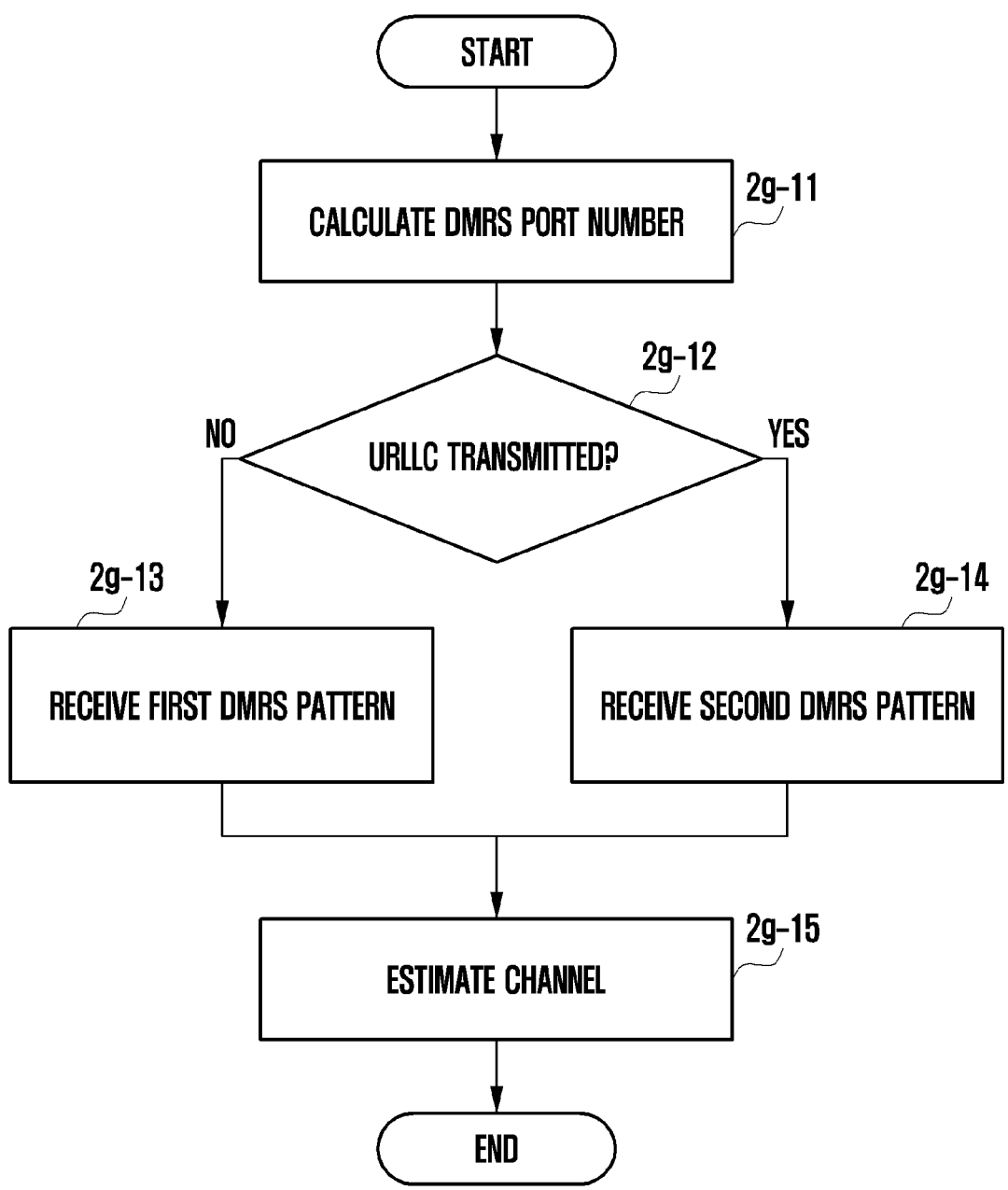

FIG. 2GA is a view illustrating a method for configuring a DMRS according to the second embodiment of the disclosure, and FIG. 2GB is a view illustrating a method for configuring a DMRS according to the second embodiment of the disclosure.

In transmitting a downlink control channel, a DMRS pattern may be implicitly configured on the basis of service type information. For example, as illustrated in FIGS. 2GA and 2GB, a DMRS pattern may be configured according to whether URLLC data is transmitted. In transmission of a downlink control channel for an URLLC, a much higher reliability as compared with that of an eMBB may be required. As a method for increasing the reliability of the downlink control channel, a high aggregation level may be used or a transmission diversity transmission technique may be used. Here, additionally, an additional improvement of performance can be expected by increasing channel estimation performance through configuration of a DMRS pattern. For example, when the URLLC is transmitted, the second DMRS pattern may be used. Further, in the URLLC transmission, there is a low possibility for multiplexing with a user, of which the downlink control channel is different, for example, MU-MIMO transmission, it is preferable for one UE to use all the DMRS transmitted to the corresponding NR-REG. The UE can implicitly acquire DMRS pattern configuration information from whether a URLLC is transmitted.

An operation of the base station of FIG. 2GA will be described.

The base station determines whether an URLLC is transmitted in operation 2G-01. The base station transmits a first DMRS pattern in operation 2*g*-02 when the URLLC is not transmitted. The base station transmits a second DMRS pattern in operation 2*g*-03 when the URLLC is transmitted.

An operation of the UE of FIG. 2GA will be described.

The UE may calculate a DMRS port number through the first embodiment of the disclosure in operation 2*g*-11. The UE may implicitly configure a DMRS pattern for a DMRS port. The UE determines whether an URLLC is transmitted in operation 2*g*-12. When an URLLC is not transmitted, the UE assumes a first DMRS pattern in operation 2*g*-13 and receives the first DMRS pattern. When an URLLC is transmitted, the UE assumes a second DMRS pattern in operation 2*g*-14 and receives the second DMRS pattern. In operation 2*g*-15, the UE may estimate a channel for the corresponding downlink control channel on the basis of the configured DMRS information.

Third Embodiment

Figure 2H:
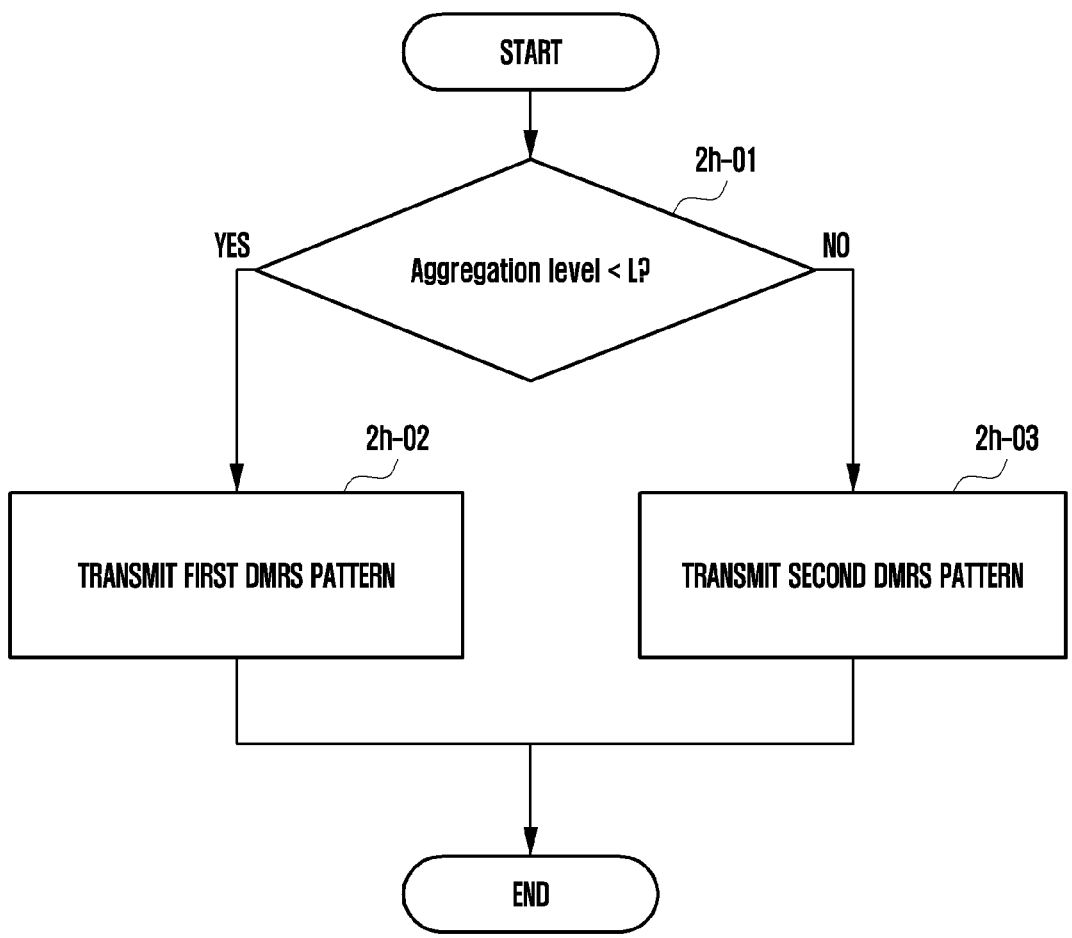
FIG. 2HA is a view illustrating a method for configuring a DMRS according to a third embodiment of the disclosure, and FIG. 2HB is a view illustrating a method for configuring a DMRS according to the third embodiment of the disclosure.
Figure 2H:
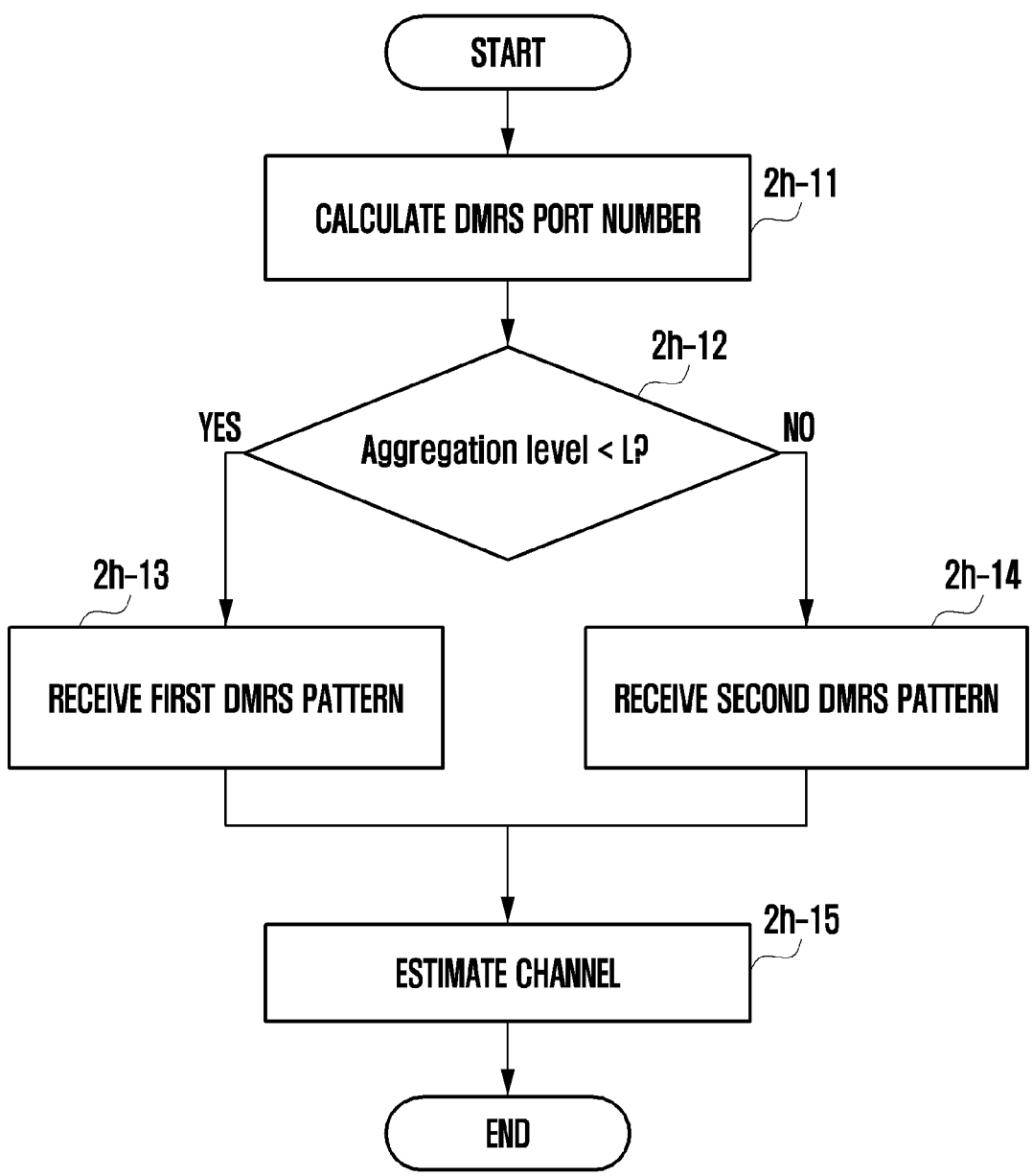

FIG. 2HA is a view illustrating a method for configuring a DMRS according to a third embodiment of the disclosure, and FIG. 2HB is a view illustrating a method for configuring a DMRS according to the third embodiment of the disclosure.

In transmitting a downlink control channel, a DMRS pattern may be implicitly configured according to an aggregation level. In a description of a more detailed example, a downlink control channel may be transmitted to a UE having a bad received signal quality at a high aggregation level. In this case, a higher channel estimation quality may be required. Further, there is a low possibility of for multiplexing with a user, of which the downlink control channel of the UE having a high aggregation level is different, for example, MU-MIMO transmission, it is preferable for one UE to use all the DMRS transmitted to the corresponding NR-REG. Accordingly, for a high aggregation level, the second DMRS pattern may be used, and during blind decoding, the UE may assume a different DMRS pattern according to the aggregation level to estimate a channel.

An operation of the base station of FIG. 2HA will be described.

The base station determines whether the aggregation level of the downlink control channel transmitted in operation 2*h*-01 exceeds a specific threshold value, for example, L. If the aggregation level is smaller than L, the base station transmits the first DMRS pattern in operation 2*h*-02. If the aggregation level is larger than L, the base station transmits the second DMRS pattern in operation 2*h*-03.

An operation of the UE of FIG. 2HB will be described.

The UE may calculate a DMRS port number through the first embodiment of the disclosure in operation 2*h*-11. The UE may implicitly configure a DMRS pattern for the acquired DMRS port. The UE may compare the aggregation level for the corresponding downlink control channel candidate with the specific threshold value, for example, L in a process of performing blinding decoding in operation 2*h*-12. If the aggregation level is smaller than L, the UE assumes a first DMRS pattern in operation 2*h*-13 and receives the first DMRS pattern. If the aggregation level is larger than L, the UE assumes a second DMRS pattern in operation 2*h*-14 and receives the second DMRS pattern. In operation 2*h*-15, the UE may estimate a channel for the corresponding downlink control channel on the basis of the configured DMRS information.

Fourth Embodiment

Figure 2I:
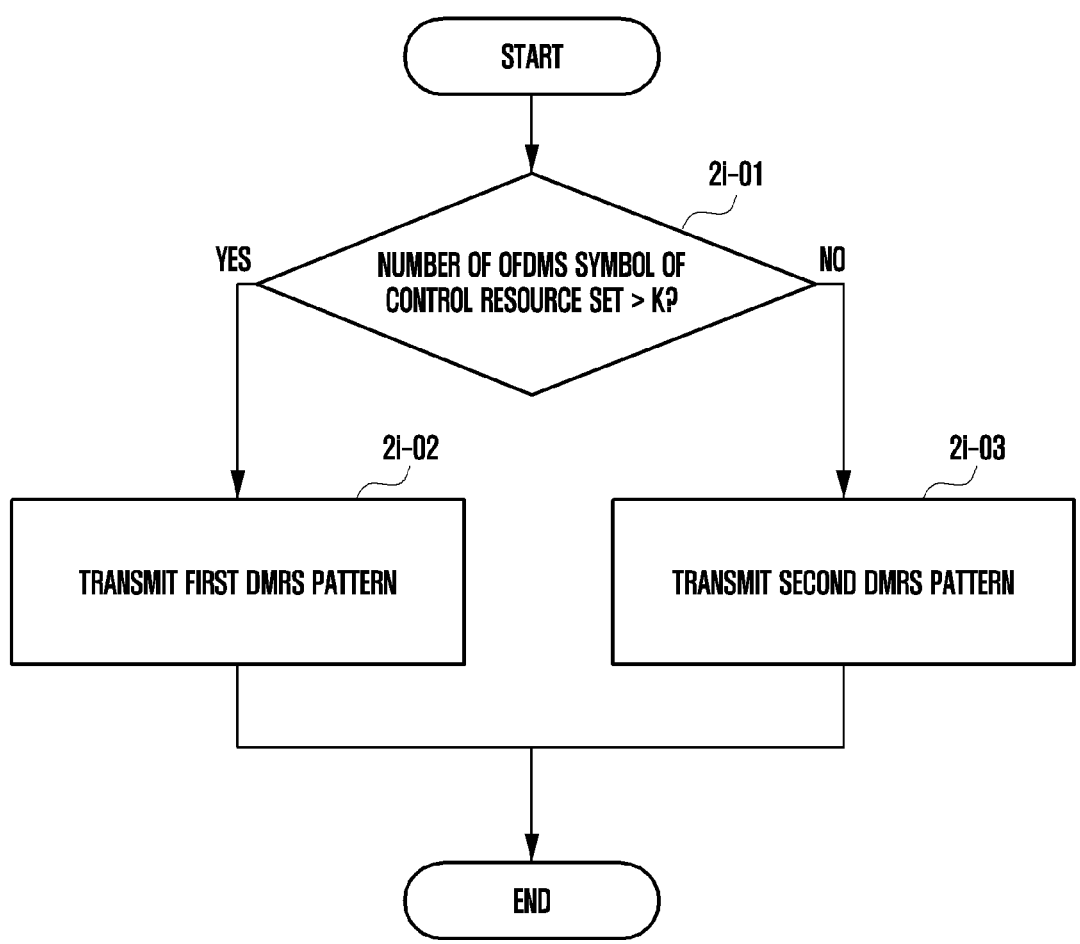
FIG. 2IA is a view illustrating a method for configuring a DMRS according to a third embodiment of the disclosure, and FIG. 2IB is a view illustrating a method for configuring a DMRS according to the third embodiment of the disclosure.
Figure 2I:
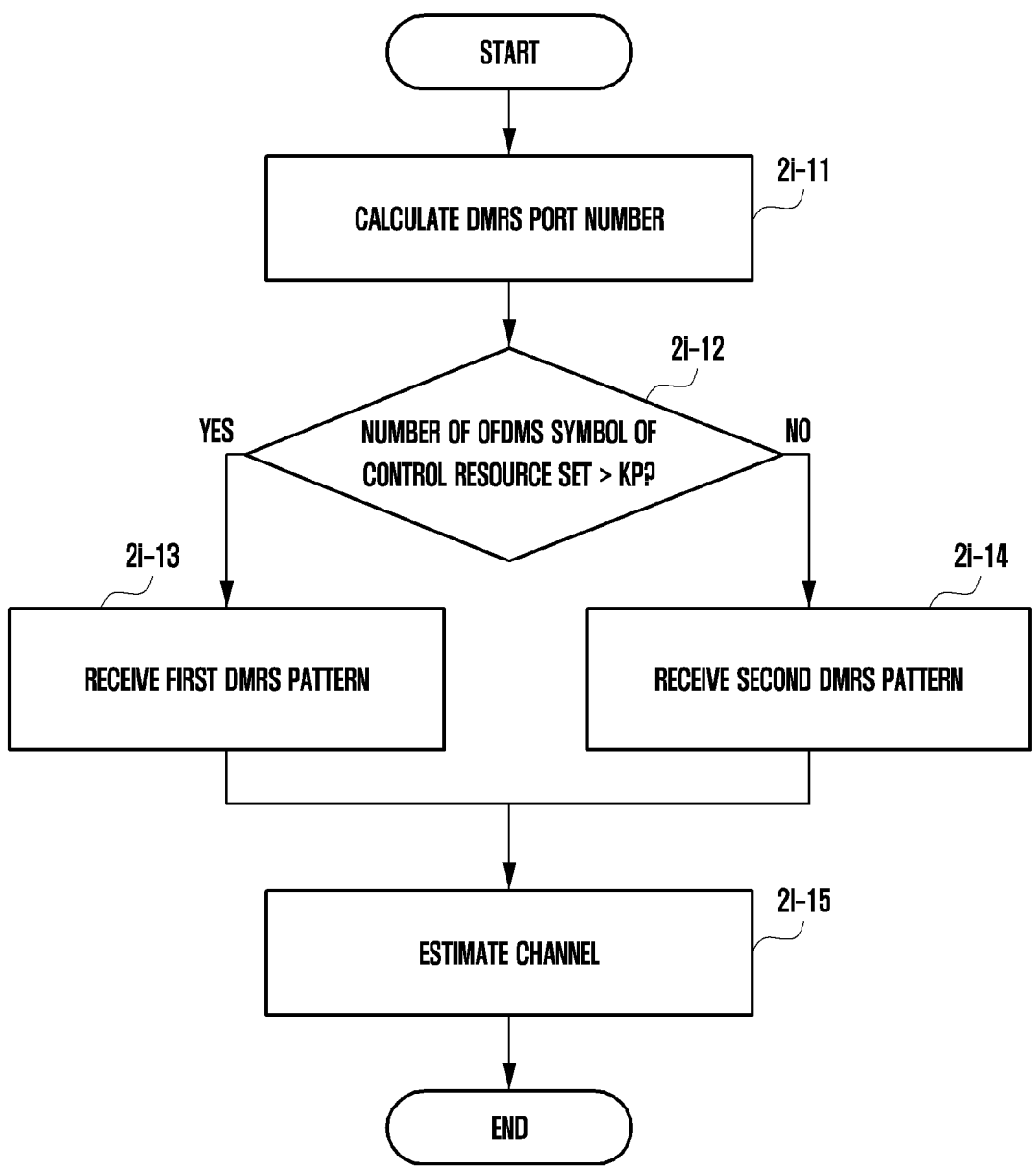

FIG. 2IA is a view illustrating a method for configuring a DMRS according to a fourth embodiment of the disclosure, and FIG. 2IB is a view illustrating a method for configuring a DMRS according to the fourth embodiment of the disclosure.

In transmitting the downlink control channel, the DMRS pattern may be implicitly configured according to the number of OFDM symbols set to a control resource set. The control resource set that is an entire resource area, in which the downlink control channel is transmitted, may vary according to the capacity of the downlink control signal that is to be transmitted by the base station. In order to efficiently use the resource, a time resource for configuring the control resource set, that is, the number of symbols may vary. For example, when the number of UEs that receive a downlink control signal is small, the resource can be more efficiently utilized by configuring the control resource set with a small number of OFDM symbols, for example, one OFDM symbol. Because whether MU-MIMO transmission of a downlink control channel is generally determined according to the capacity of the downlink control channel, it is preferable that MU-MIMO transmission is not made when a downlink control signal of a low capacity is transmitted. Accordingly, the UE may use a second DMRS pattern according to the number of OFDM symbols of the control resource set.

An operation of the base station of FIG. 2IA will be described.

The base station determines whether the number of OFDM symbols of a control resource set, to which the downlink control channel is transmitted, exceeds a specific threshold value, for example, K in operation 2i-01. If the number of the OFDM symbols of the control resource set is larger than K, the base station transmits a first DMRS pattern in operation 2i-02. If the number of the OFDM symbols of the control resource set is smaller than K, the base station transmits a second DMRS pattern in operation 2i-03.

An operation of the UE of FIG. 2IB will be described.

The UE may calculate a DMRS port number through the first embodiment of the disclosure in operation 2i-11. The UE may implicitly configure a DMRS pattern for the acquired a DMRS port. The UE determines whether the number of OFDM symbols of a control resource set, to which the downlink control channel is transmitted, exceeds a specific threshold value, for example, K in operation 2i-12. If the number of the OFDM symbols of the control resource set is larger than K, the UE transmits a first DMRS pattern in operation 2i-13. If the number of the OFDM symbols of the control resource set is smaller than K, the base station transmits a second DMRS pattern in operation 2i-14. In operation 2i-15, the UE may estimate a channel for the corresponding downlink control channel on the basis of the configured DMRS information.

Until now, a method for implicitly indicating configuration of a DMRS pattern has been described. Hereinafter, a method for configuring a configuration of a DMRS pattern through an indicator will be described.

Fifth Embodiment

Figure 2J:
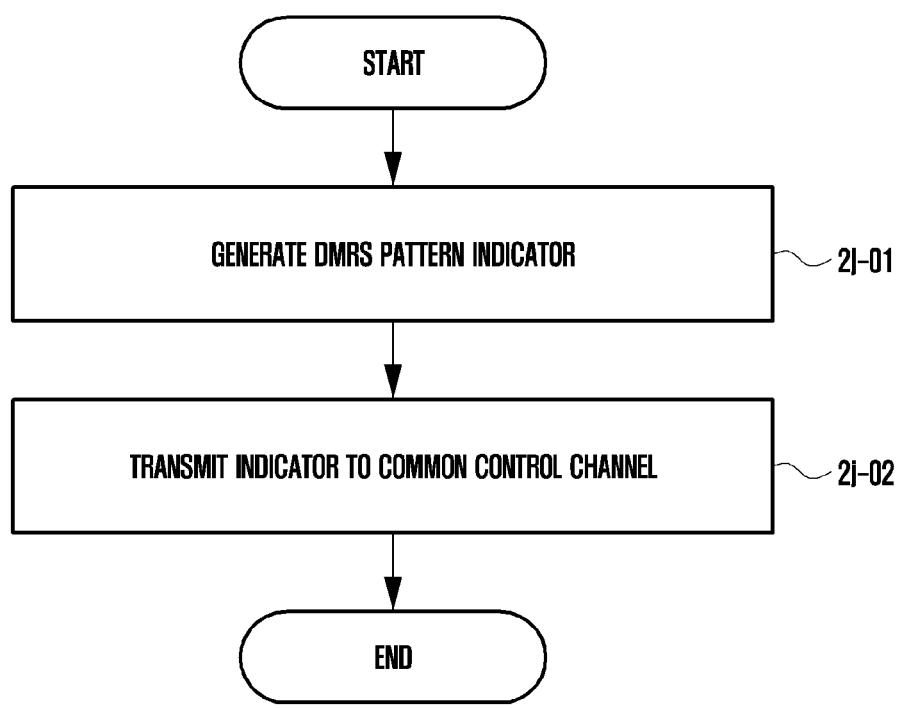
FIG. 2JA is a view illustrating a method for configuring a DMRS according to a fourth embodiment of the disclosure, and FIG. 2JB is a view illustrating a method for configuring a DMRS according to the fourth embodiment of the disclosure.
Figure 2J:
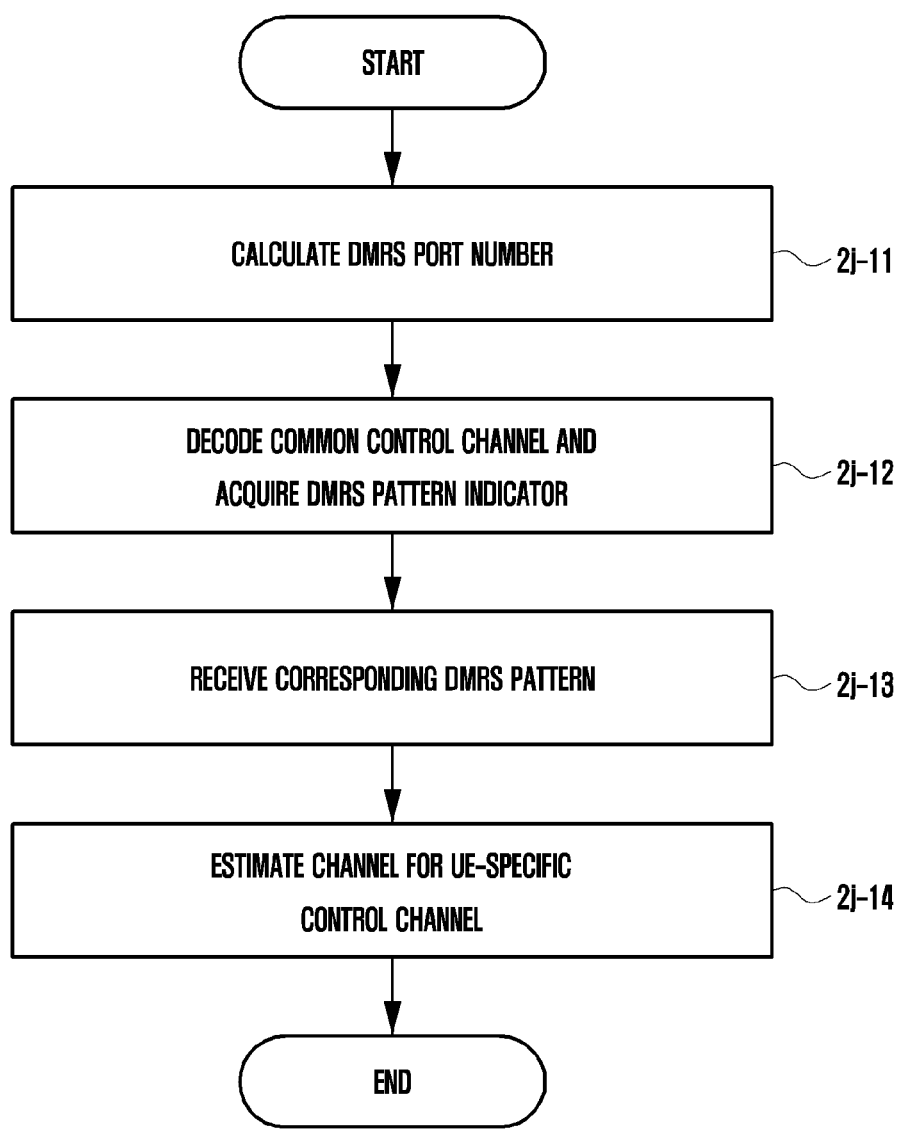

FIG. 2JA is a view illustrating a method for configuring a DMRS according to a fifth embodiment of the disclosure, and FIG. 2JB is a view illustrating a method for configuring a DMRS according to the fifth embodiment of the disclosure.

The 5G downlink control channel may include a common control channel (or a group-common control channel) and a UE-specific control channel. In the common control channel, the DMRS may be configured cell-specifically, and this may be configured by using a predetermined configuration nor by using an MIB. The DMRS of the UE-specific control channel may be configured UE-specifically, and the indicator for the DMRS may be transmitted from the common control channel. In a description of a more detailed example, the UE may decode the common control channel first prior to decoding the UE-specific control channel, and may receive an indicator for the DMRS pattern of the UE-specific control channel from the DCI of the common control channel. Then, in order to minimize an overhead for the UE-specific DCI transmitted to the common control channel, it is preferable to transmit only pattern information of the DMRS. The UE may calculate the DMRS port configuration information as the first embodiment of the disclosure, and the information on the DMRS pattern for the corresponding DMRS port may be received from the common control channel.

An operation of the base station of FIG. 2JA will be described.

The base station generates a DMRS pattern indicator for the downlink control panel in operation 2j-01. The base station transmits the DMRS pattern indicator to the common control channel in operation 2j-02.

An operation of the UE of FIG. 2JB will be described.

The UE may calculate a DMRS port number through the first embodiment of the disclosure in operation 2j-11. The UE may decode the common control channel in operation 2j-12, and may acquire a DMRS pattern indicator. The UE receives the DMRS by using the DMRS pattern configured through the DMRS pattern indicator acquired in operation 2j-13. The UE may estimate a channel for a UE-specific control channel on the basis of the DMRS pattern acquired in operation 2j-14.

Sixth Embodiment

Figure 2K:
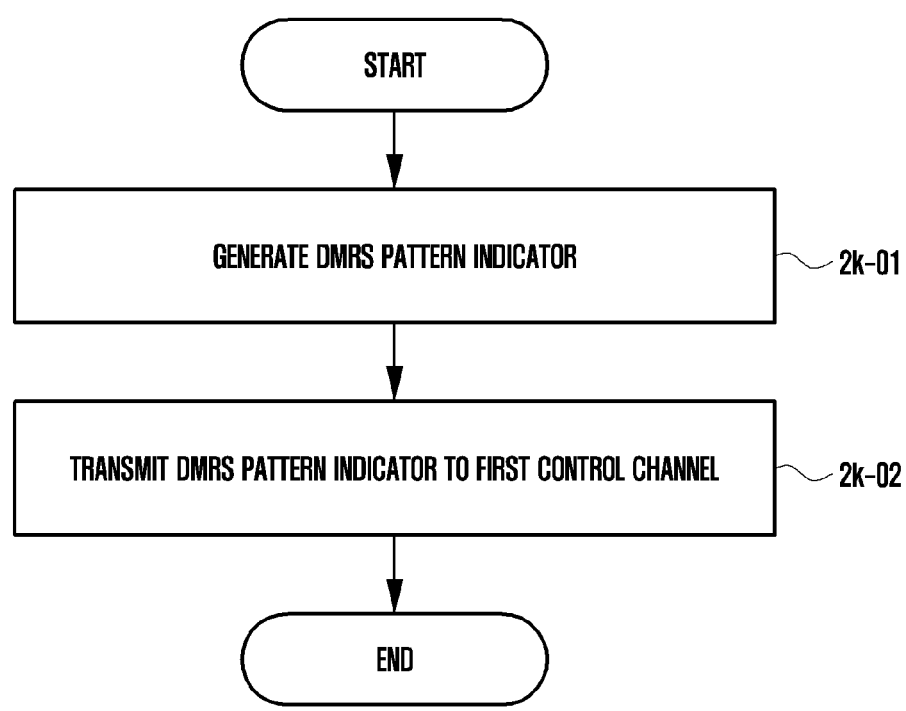
FIG. 2KA is a view illustrating a method for configuring a DMRS according to a fifth embodiment of the disclosure, and FIG. 2KB is a view illustrating a method for configuring a DMRS according to the fifth embodiment of the disclosure.
Figure 2K:
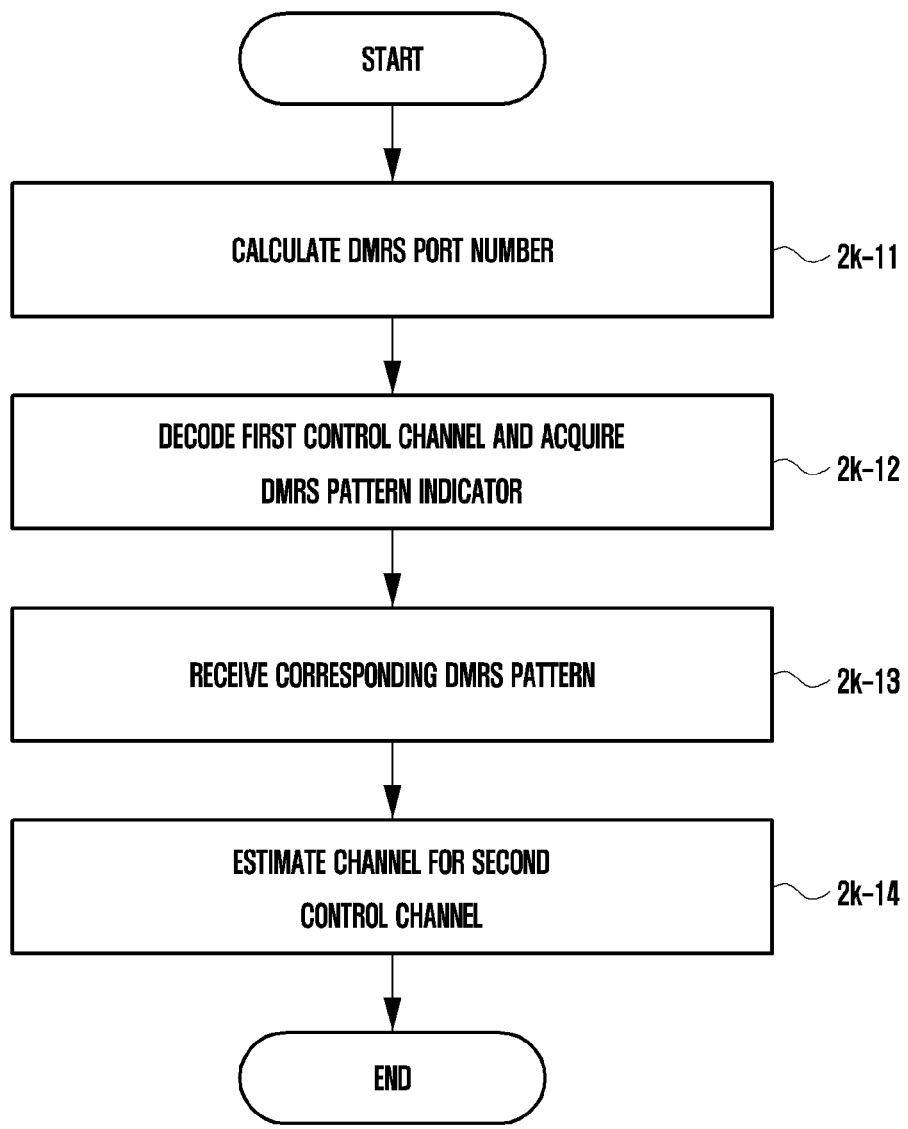

FIG. 2KA is a view illustrating a method for configuring a DMRS according to a sixth embodiment of the disclosure, and FIG. 2KB is a view illustrating a method for configuring a DMRS according to the sixth embodiment of the disclosure.

The 5G downlink control channel may include two-staged control channels of a first control channel and a second control channel. The first control channel and the second control channel may transmit independent DCIs. For example, some fields of the entire DCI may be transmitted to the first control channel, and the remaining fields, except for the DCI fields transmitted to the first control channel, may be transmitted to the second control channel. Both of the first control channel and the second control channel may be transmitted to the control resource set. Further, the first control channel may be transmitted to the control resource set, and the second control channel may be transmitted to a data transmission area. Both of the first control channel and the second control channel may be UE-specific control channels. In decoding the above-described second staged downlink control channel, the UE decodes the first control channel first, and decodes the second control channel later. Accordingly, the base station may transmit the DMRS pattern configuration indicator for the second control channel to the first control channel. Then, the DMRS pattern of the first control channel has to use a predetermined pattern.

An operation of the base station of FIG. 2KA will be described.

The base station generates a DMRS pattern indicator for the downlink control panel in operation 2k-01. The base station transmits the DMRS pattern indicator to the first control channel in operation 2k-02.

An operation of the UE of FIG. 2KB will be described.

The UE may calculate a DMRS port number through the first embodiment of the disclosure in operation 2k-11. The UE may decode the first control channel in operation 2k-12, and may acquire a DMRS pattern indicator. The UE receives the DMRS by using the DMRS pattern configured through the DMRS pattern indicator acquired in operation 2k-13. The UE may estimate a channel for the second control channel on the basis of the DMRS pattern acquired in operation 2k-14.

Figure 2L:
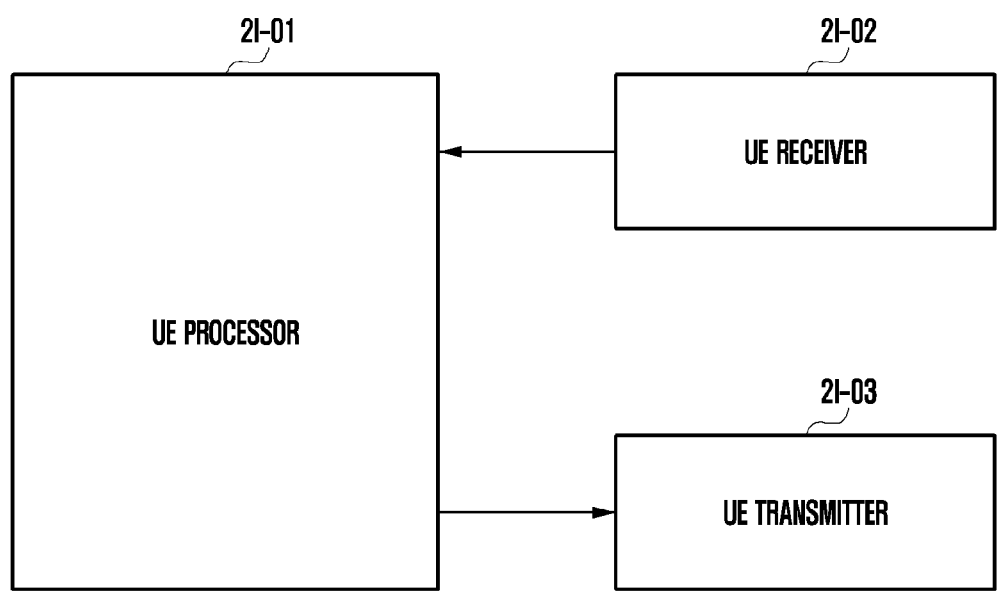
FIG. 2L is a block diagram of an internal structure of a terminal according to an embodiment of the disclosure.
Figure 2M:
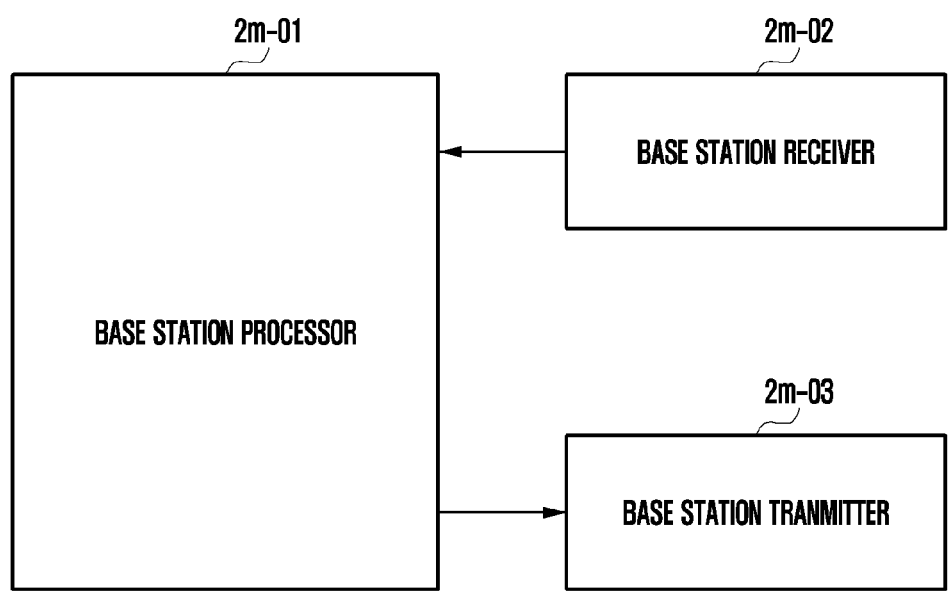
FIG. 2M is a block diagram of an internal structure of a base station according to an embodiment of the disclosure.

To perform the embodiments of the disclosure, transmitters, receivers, and controllers of the UE and the base station are illustrated in FIG. 2L and FIG. 2M, respectively. The structure of the base station and the UE for setting an DMRS for a downlink control channel in the 5G communication system corresponding to the first embodiment, the second embodiment, the third embodiment, the fourth embodiment, the fifth embodiment, and the sixth embodiment are illustrated, and to perform this, the transmitter, the receiver, and the processor of the base station and the UE have to be operated according to the embodiments.

In detail, FIG. 2L is a block diagram of an internal structure of a UE according to an embodiment of the disclosure. As illustrated in FIG. 2L, the UE of the disclosure may include a UE processor 2l-01, a receiver 2l-02, and a transmitter 2l-03.

The UE processor 2l-01 may control a series of processes in which the UE may be operated according to the embodiment of the disclosure. For example, a downlink control channel decoding operation and the like may be differently controlled according to configuration of a DMRS port, DMRS pattern configuration information, and the like according to the embodiment of the disclosure. The UE receiver 2l-2 and the UE transmitter 2l-03 are generally referred as a transceiver in the embodiment of the disclosure. The transceiver may transmit and receive a signal to/from a base station. The signal may include control information and data. To this end, the transceiver includes an RF transmitter that up-converts and amplifies a frequency of a transmitted signal, an RF receiver that low-noise amplifies a received signal and down-converts the frequency, and the like. Further, the transceiver may receive a signal through a wireless channel to output the signal to the UE processor 2l-01, and the UE processor 2l-01 may transmit the output signal to through the wireless channel.

FIG. 2M is a block diagram of an internal structure of a base station according to an embodiment of the disclosure. As illustrated in FIG. 2M, the base station of the disclosure may include a base station processor 2m-01, a receiver 2m-02, and a transmitter 2m-03.

The base station processor 1703 may control a series of processes such that the base station operates according to the above-described embodiments of the disclosure. For example, downlink control channel resource allocation, a transmission scheme, and the like may be differently controlled according to configuration of a DMRS port, DMRS pattern configuration information, and the like according to the embodiment of the disclosure. Further, if necessary, it may be controlled such that an additional indicator for the DMRS pattern information is transmitted. The base station receiver 2m-2 and the base station transmitter 2m-03 are generally referred as a transceiver in the embodiment of the disclosure. The transceiver may transmit and receive a signal to/from a terminal. The signal may include control information and data. To this end, the transceiver includes an RF transmitter that up-converts and amplifies a frequency of a transmitted signal, an RF receiver that low-noise amplifies a received signal and down-converts the frequency, and the like. Further, the transceiver may receive a signal through a wireless channel to output the signal to the base station processor 2m-01, and the base station processor 2m-01 may transmit the output signal to through the wireless channel.

Meanwhile, the embodiments of the disclosure disclosed in the specification and the drawings have been presented to easily explain technical contents of the disclosure and help comprehension of the disclosure, and do not limit the scope of the disclosure. That is, it is obvious to those skilled in the art to which the disclosure belongs that different modifications can be achieved based on the technical spirit of the disclosure. Further, if necessary, the above respective embodiments may be employed in combination.

The invention claimed is:

1. A method by a base station, in a wireless mobile communication system the method comprising:
   identifying a service type of a terminal, the terminal being associated with a first antenna port;
   determining a demodulation reference signal (DM-RS) pattern based on the identified service type of the terminal from among a first DM-RS pattern and a second DM-RS pattern, the first DM-RS pattern being based on a first resource corresponding to the first antenna port, and the second DM-RS pattern being based on a second resource corresponding to the first antenna port and a second antenna port; and
   transmitting, to the terminal, a downlink control channel and a DM-RS based on the DM-RS pattern.

2. The method of claim 1, wherein a number of DM-RS resources for the second DM-RS pattern is greater than a number of DM-RS resources for the first DM-RS pattern.

3. The method of claim 1 wherein in case that the identified service type of the terminal corresponds to an ultra-reliable and low latency communication (URLLC), the DM-RS pattern is determined as the second DM-RS pattern.

4. The method of claim 1, wherein a first type of the second DM-RS pattern corresponds to transmitting the DM-RS on the second resource, and a second type of the second DM-RS pattern corresponds to transmitting a downlink control information (DCI) on a resource associated with the second antenna port.

5. A method by a terminal in a wireless mobile communication system, the method comprising:
   identifying a first antenna port associated with the terminal;
   identifying a service type of the terminal;
   determining a demodulation reference signal (DM-RS) pattern based on the identified service type of the terminal; and
   receiving a downlink control channel and a DM-RS based on the DM-RS pattern,
   wherein the DM-RS pattern is determined based on the identified service type of the terminal from among a first DM-RS pattern and a second DM-RS pattern, the first DM-RS pattern being based on a first resource corresponding to the first antenna port, and the second DM-RS pattern being based on a second resource corresponding to the first antenna port and a second antenna port.

6. The method of claim 5, wherein a number of DM-RS resources for the second DM-RS pattern is greater than a number of DM-RS resources for the first DM-RS pattern.

7. The method of claim 5, wherein in case that the identified service type of the terminal corresponds to an ultra-reliable and low latency communication (URLLC), the DM-RS pattern is determined as the second DM-RS pattern.

8. A base station of a wireless mobile communication system, the base station comprising:
a transceiver; and
a controller configured to:
identify a service type of a terminal, the terminal being associated with a first antenna port;
determine a demodulation reference signal (DM-RS) pattern based on the identified service type of the terminal from among a first DM-RS pattern and a second DM-RS pattern; and
transmit, to the terminal, a downlink control channel and a DM-RS based on the DM-RS pattern,
wherein the first DM-RS pattern is based on a first resource corresponding to the first antenna port, and the second DM-RS pattern is based on a second resource corresponding to the first antenna port and a second antenna port.

9. The base station of claim 8, wherein a number of DM-RS resources for the second DM-RS pattern is greater than a number of DM-RS resources for the first DM-RS pattern.

10. The base station of claim 8, wherein in case that the identified service type of the terminal corresponds to an ultra-reliable and low latency communication (URLLC), the DM-RS pattern is determined as the second DM-RS pattern.

11. The base station of claim 8, wherein a first type of the second DM-RS pattern corresponds to transmitting the DM-RS on the second resource, and a second type of the second DM-RS pattern corresponds to transmitting a downlink control information (DCI) on a resource associated with the second antenna port.

12. A terminal of a wireless mobile communication system, the terminal comprising:
a transceiver; and
a controller configured to:
identify a first antenna port associated with the terminal;
identify a service type of the terminal;
determine a demodulation reference signal (DM-RS) pattern based on the identified service type of the terminal; and
receive a downlink control channel and a DM-RS based on the DM-RS pattern,
wherein the DM-RS pattern is determined based on the identified service type of the terminal from among a first DM-RS pattern and a second DM-RS pattern, the first DM-RS pattern being based on a first resource corresponding to the first antenna port, and the second DM-RS pattern being based on a second resource corresponding to the first antenna port and a second antenna port.

13. The terminal of claim 12, wherein a number of DM-RS resources for the second DM-RS pattern is greater than a number of DM-RS resources for the first DM-RS pattern.

14. The terminal of claim 12, wherein in case that the service type of the terminal corresponds to an ultra-reliable and low latency communication (URLLC), the DM-RS pattern is determined as the second DM-RS pattern.

* * * * *